(12) United States Patent
Wu et al.

(10) Patent No.: US 12,413,100 B2
(45) Date of Patent: Sep. 9, 2025

(54) WIRELESS ELECTRIC ENERGY TRANSMISSION SYSTEM

(71) Applicant: Huawei Digital Power Technologies Co., Ltd., Shenzhen (CN)

(72) Inventors: Baoshan Wu, Dongguan (CN); Chengliang Zhang, Dongguan (CN); Donghao Wu, Shenzhen (CN); Wei Lu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 605 days.

(21) Appl. No.: 17/852,686

(22) Filed: Jun. 29, 2022

(65) Prior Publication Data

US 2022/0337094 A1 Oct. 20, 2022

Related U.S. Application Data

(63) Continuation of application No. PCT/CN2020/138965, filed on Dec. 24, 2020.

(30) Foreign Application Priority Data

Dec. 31, 2019 (CN) .......................... 201911424812.8

(51) Int. Cl.
*H02J 50/12* (2016.01)
*H02J 50/60* (2016.01)
(Continued)

(52) U.S. Cl.
CPC .............. *H02J 50/12* (2016.02); *H02J 50/60* (2016.02); *H02J 50/80* (2016.02); *H02J 50/90* (2016.02)

(58) Field of Classification Search
CPC ............. H02J 50/12; H02J 50/80; H02J 50/90
See application file for complete search history.

(56) References Cited

U.S. PATENT DOCUMENTS 9,450,648 B2 * 9/2016 Bastami .................. H02J 50/80
9,570,231 B2 2/2017 Miyamoto et al.
(Continued)

FOREIGN PATENT DOCUMENTS

| CN | 101425703 A | 5/2009 |
| CN | 102157990 A | 8/2011 |

(Continued)

OTHER PUBLICATIONS

Chen et al., "Analysis, Design, and Control of a Transcutaneous Power Regulator for Artificial Hearts", IEEE Transactions on Biomedical Circuits and Systems, vol. 3, No. 1, Feb. 2009, 9 pages.

*Primary Examiner* — Daniel Kessie
*Assistant Examiner* — Brian K Baxter
(74) *Attorney, Agent, or Firm* — Maier & Maier, PLLC

(57) ABSTRACT

A wireless electric energy transmission system is provided, including a transmitter and a receiver. The transmitter includes a DC/AC inverter circuit, a first inductor, and a first capacitor that are connected in series. The transmitter is configured to: detect a value of a resonant frequency of the transmitter; detect a value of a coupling coefficient between the transmitter and the receiver; obtain a value of a constant-voltage operating frequency of the transmitter through calculation based on the resonant frequency and the coupling coefficient; and control an operating frequency of the DC/AC inverter circuit based on the constant-voltage operating frequency obtained through calculation.

19 Claims, 15 Drawing Sheets

(51) Int. Cl.
   *H02J 50/80*     (2016.01)
   *H02J 50/90*     (2016.01)

(56) References Cited

U.S. PATENT DOCUMENTS

| | | | |
|---|---|---|---|
| 9,601,942 B2 * | 3/2017 | Bae | H02J 50/12 |
| 9,634,495 B2 * | 4/2017 | Bourilkov | H02J 50/12 |
| 10,072,947 B1 | 9/2018 | Mantler | |
| 10,079,508 B2 | 9/2018 | Mehas et al. | |
| 10,333,355 B2 * | 6/2019 | Huang | G01R 33/0283 |
| 10,840,745 B1 * | 11/2020 | Maniktala | H02J 50/60 |
| 10,938,248 B1 | 3/2021 | Imazawa | H02J 50/12 |
| 11,171,512 B2 * | 11/2021 | Kim | H02J 50/10 |
| 2010/0219696 A1 | 9/2010 | Kojima | |
| 2012/0001493 A1 | 1/2012 | Kudo et al. | |
| 2013/0051083 A1 * | 2/2013 | Zhao | H02J 50/12 363/17 |
| 2013/0094598 A1 | 4/2013 | Bastami | |
| 2013/0154373 A1 * | 6/2013 | Lisuwandi | H02J 50/12 307/34 |
| 2014/0300196 A1 * | 10/2014 | Bunsen | H02J 50/12 307/104 |
| 2016/0079951 A1 | 3/2016 | Oosumi et al. | |
| 2017/0229926 A1 | 8/2017 | Oettinger et al. | |
| 2017/0373540 A1 * | 12/2017 | Guidi | H02M 3/33507 |
| 2018/0069441 A1 * | 3/2018 | Kanno | H02J 7/00047 |
| 2018/0159371 A1 * | 6/2018 | Kim | H02J 50/80 |
| 2018/0287434 A1 | 10/2018 | Ii et al. | |
| 2019/0067992 A1 * | 2/2019 | Liu | H02J 50/80 |
| 2019/0248251 A1 | 8/2019 | Park | |

FOREIGN PATENT DOCUMENTS

| | | |
|---|---|---|
| CN | 102315698 A | 1/2012 |
| CN | 104079081 A | 10/2014 |
| CN | 104167823 A | 11/2014 |
| CN | 105334539 A | 2/2016 |
| CN | 105515218 A | 4/2016 |
| CN | 106340974 A | 1/2017 |
| CN | 106740220 A | 5/2017 |
| CN | 206406776 U | 8/2017 |
| CN | 108363108 A | 8/2018 |
| CN | 108604834 A | 9/2018 |
| CN | 108736581 A | 11/2018 |
| CN | 108736588 A | 11/2018 |
| CN | 108802835 A | 11/2018 |
| CN | 109412280 A | 3/2019 |
| CN | 109895643 A | 6/2019 |
| CN | 111030318 A | 4/2020 |
| DE | 112019001196 T5 | 12/2020 |
| EP | 3393009 A1 | 10/2018 |
| EP | 3553915 A1 | 10/2019 |
| JP | 2015223009 A | 12/2015 |
| KR | 20140139348 A | 12/2014 |
| WO | 2014041863 A1 | 3/2014 |
| WO | 2017165549 A1 | 9/2017 |
| WO | 2018074804 A1 | 4/2018 |
| WO | 2018105915 A1 | 6/2018 |
| WO | 2019171786 A1 | 9/2019 |

* cited by examiner

WIRELESS ELECTRIC ENERGY TRANSMISSION SYSTEM

CROSS-REFERENCE TO RELATED APPLICATIONS

This application is a continuation of International Application No. PCT/CN2020/138965 filed on Dec. 24, 2020, which claims priority to Chinese Patent Application No. 201911424812.8 filed on Dec. 31, 2019. The disclosures of the aforementioned applications are hereby incorporated by reference in their entireties.

TECHNICAL FIELD

The embodiments relate to the circuit field and a wireless electric energy transmission system.

BACKGROUND

Customer premise equipment (CPE) is a device that receives a mobile signal and that forwards the mobile signal by using a wireless Wi-Fi signal and converts a 4G or 5G signal into a Wi-Fi signal. As shown in FIG. 1, the CPE includes an outdoor unit (ODU) and an indoor unit (IDU). In a process of transmitting a signal from the outdoor to the indoor, the signal needs to penetrate through a wall or glass, causing a large loss of the mobile signal. Therefore, the mobile signal needs to be received by the outdoor unit ODU, transmitted to the indoor unit IDU, and converted by the indoor unit IDU into a Wi-Fi signal. In an existing CPE solution, an indoor unit is connected to an outdoor unit in a wired manner by using power over Ethernet (POE), and a cable needs to be laid by punching a hole in a wall.

To resolve a power supply problem between the ODU and the IDU, the industry focuses on implementing electric energy transmission between the indoor unit and the outdoor unit in a wireless manner, to avoid installation performed by punching a hole in a wall, thereby reducing costs. As shown in FIG. 1, the indoor unit may include a wireless power supply unit 101 and a load 102 (for example, a wireless/laser modem), the outdoor unit may include a wireless power receiving unit 103 and a load 104 (for example, a wireless/laser modem), and the indoor unit supplies power to the outdoor unit in a wireless manner. Electric energy is transmitted between the indoor unit and the outdoor unit by using the wireless power supply unit 101 and the wireless power receiving unit 103. The wireless power supply unit 101 is an electric energy transmitter (TX) in a wireless electric energy transmission system, and the wireless power receiving unit 103 is an electric energy receiver (RX) in the wireless electric energy transmission system.

In a process of transmitting electric energy between the wireless power supply unit 101 and the wireless power receiving unit 103, to ensure normal operating of the load of the receiver, an output voltage of the receiver needs to be kept steady through loop control: When load of the receiver dynamically changes, an operating frequency of the transmitter needs to be constantly modulated, so that the output voltage of the receiver is kept steady. However, this wireless electric energy transmission mode requires a quick response from the transmitter, but a loop control response is slow. Therefore, when the load of the receiver dynamically changes, a power failure may occur in the wireless electric energy transmission system due to an untimely response.

SUMMARY

The embodiments provide a wireless electric energy transmission system. A constant-voltage operating frequency is detected and obtained through calculation, so that steadiness of an output voltage can be improved. The constant-voltage operating frequency is an operating frequency of a transmitter that is obtained when an output voltage of a receiver is independent of load of the receiver.

According to a first aspect, a wireless electric energy transmission system may include a transmitter and a receiver. The transmitter includes a DC/AC inverter circuit, a first inductor, and a first capacitor that are connected in series. The receiver includes an AC/DC rectifier circuit, a second inductor, and a second capacitor that are connected in series. Electric energy of the transmitter is transmitted to the receiver through electromagnetic induction between the first inductor and the second inductor. The AC/DC rectifier circuit is configured to rectify the electric energy transmitted by the transmitter to the receiver. The inductor may also be referred to as a coil.

The transmitter is configured to perform the following steps:

A value of a resonant frequency of the transmitter is detected. A series resonant circuit has a frequency selection characteristic: When an input end is connected to a sinusoidal alternating current voltage source with a constant amplitude, if a frequency of an input voltage is changed, a signal amplitude of an output voltage of the series resonant circuit changes with a frequency of an input signal. $f_0$ is referred to as a resonant frequency of the series resonant circuit. In this case, an inductor and a capacitor in the series resonant circuit exchange energy. This is equivalent to a conducting wire externally.

A value of a coupling coefficient between the transmitter and the receiver is detected. In a circuit, a coupling coefficient indicates a coupling degree between elements, and a ratio of an actual mutual inductance (absolute value) between two inductor elements to a maximum limit value thereof is defined as a coupling coefficient. In the wireless electric energy transmission system, the coupling coefficient may indicate a proportion of energy received by the inductor of the receiver to energy sent by the inductor of the transmitter. A larger coupling coefficient indicates a larger proportion of the energy received by the inductor of the receiver to the energy sent by the inductor of the transmitter. The coupling coefficient is correlated with a distance between the inductor of the transmitter and the inductor of the receiver and is also correlated with a medium between the inductor of the transmitter and the inductor of the receiver.

A value of a constant-voltage operating frequency of the transmitter is obtained through calculation based on the resonant frequency and the coupling coefficient. The constant-voltage operating frequency of the transmitter is an operating frequency of the DC/AC inverter circuit of the transmitter.

An operating frequency of the DC/AC inverter circuit is controlled based on the constant-voltage operating frequency obtained through calculation. The constant-voltage operating frequency is an operating frequency of the DC/AC inverter circuit that is obtained when an output voltage of the AC/DC rectifier circuit is independent of load of the receiver.

The constant-voltage operating frequency of the transmitter is obtained through detection. Because the transmitter operates at the constant-voltage operating frequency, an output voltage of the receiver is not affected by a load change, so that a dynamic response requirement of the wireless electric energy transmission system can be met. According to the wireless electric energy transmission system, steadiness of an output voltage can be improved, thereby reducing a quantity of power failure times in an electric energy transmission process of the wireless electric energy transmission system.

In an implementation, the receiver is configured to:

detect a value of an output voltage of the AC/DC rectifier circuit; and the transmitter is configured to:

calculate a value of a first inductance based on the resonant frequency and a first capacitance;

detect a value of a first current of the transmitter that passes through the first inductor at a first operating frequency, where the first operating frequency is an actual operating frequency of the DC/AC circuit of the transmitter that is obtained when an inductance of the transmitter is measured; and obtain the value of the coupling coefficient through calculation based on values of the output voltage of the AC/DC rectifier circuit, the first inductance, the first current, and the first operating frequency.

In an implementation, the transmitter is further configured to:

obtain the value of the coupling coefficient through calculation based on values of the output voltage of the AC/DC rectifier circuit, the first inductance, the first current, the first operating frequency, and a calibration coefficient. In a detection process, an operating status of the wireless electric energy transmission system may be a no-load state, a half-load state, or a full-load state, and there may be errors in detection in different operating states. Therefore, the system may correspond to one calibration system in different operating states.

In an implementation, the transmitter is configured to:

in a discharging process of the first capacitor, obtain the resonant frequency of the transmitter through calculation based on an oscillation period of a voltage between the first capacitor and the first inductor.

In an implementation, the receiver is configured to detect an output voltage of the receiver; and the transmitter is configured to:

determine that a value of a gain is not equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in the no-load state;

modulate, within a preset range, the constant-voltage operating frequency obtained through calculation, until the value of the gain is equal to the first threshold, where the preset range is a range that is of small-range frequency modulation and that is set based on the constant-voltage operating frequency, the preset range is a sub interval of an operating frequency range of the DC/AC inverter circuit, and the small-range frequency modulation can improve accuracy of the constant-voltage operating frequency, thereby improving steadiness of an output voltage provided by the wireless electric energy transmission system; and control the operating frequency of the DC/AC inverter circuit to be a modulated constant-voltage operating frequency; in other words, control the DC/AC inverter circuit to operate at the modulated constant-voltage operating frequency.

In an implementation, the transmitter is configured to control the operating frequency of the DC/AC inverter circuit to be the constant-voltage operating frequency obtained through calculation.

In an implementation, the receiver is configured to detect an output voltage of the receiver; and the transmitter is configured to:

determine that a value of a gain is not equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in the no-load state;

perform frequency sweeping within a preset range based on the constant-voltage operating frequency obtained through calculation, until the value of the gain is equal to the first threshold, where the preset range is a frequency range of small-range frequency sweeping, and the preset range is a sub interval of the operating frequency range of the DC/AC inverter circuit; and control the operating frequency of the DC/AC inverter circuit to be a modulated constant-voltage operating frequency, where the modulated constant-voltage operating frequency is a constant-voltage operating frequency obtained when the value of the gain is equal to the first threshold; in other words, control the DC/AC inverter circuit to operate at the modulated constant-voltage operating frequency.

After the constant-voltage operating frequency of the DC/AC inverter circuit is obtained through calculation, frequency sweeping is performed within a specific range of the constant-voltage operating frequency obtained through calculation. In addition, the value of the gain of the system is detected until the value of the gain reaches the first threshold. In this case, an operating frequency of the DC/AC inverter circuit that is obtained through "sweeping" is the modulated constant-voltage operating frequency. The DC/AC inverter circuit of the transmitter is controlled to operate at the modulated constant-voltage operating frequency, so that an output voltage of the receiver can be kept steady without being affected by a load change.

In an implementation, the transmitter further includes a DC/DC circuit, the DC/DC circuit is connected to the DC/AC inverter circuit in series, and the DC/DC circuit is located at a previous stage of the DC/AC inverter circuit;

the receiver is configured to detect an output voltage of the receiver; and the transmitter is configured to:

determine that the constant-voltage operating frequency obtained through calculation does not fall within the operating frequency range of the DC/AC inverter circuit;

control the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; in other words, control the DC/AC inverter circuit to operate at an operating frequency corresponding to a limit value that is closer to the constant-voltage operating frequency obtained through calculation; and regulate an output voltage of the DC/DC circuit until a value of a gain is equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in the no-load state.

In an implementation, the receiver further includes a DC/DC circuit, the DC/DC circuit is connected to the AC/DC rectifier circuit in series, and the DC/DC circuit is located at a next stage of the AC/DC rectifier circuit;

the receiver is configured to detect an output voltage of the receiver; and the transmitter is configured to:

determine that the constant-voltage operating frequency obtained through calculation does not fall within the operating frequency range of the DC/AC inverter circuit, where the operating frequency range of the DC/AC inverter circuit is known, and may be preset based on an application scenario of the DC/AC inverter circuit;

control the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; and regulate an output voltage of the DC/DC circuit until a value of a gain is equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in the no-load state.

In an implementation, the receiver is configured to detect an output voltage of the receiver; and the transmitter is configured to:

determine that the constant-voltage operating frequency obtained through calculation does not fall within the operating frequency range of the DC/AC inverter circuit;

control the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; and adjust a duty ratio of the DC/AC inverter circuit until a value of a gain is equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in the no-load state. The duty ratio is a concept in a plurality of fields such as a radio frequency, a microwave circuit, a low-frequency alternating current, and a direct current, and indicates a ratio of operating time to total time in one period.

According to a second aspect, a wireless electric energy transmission method is applied to a wireless electric energy transmission system. The system includes a transmitter and a receiver. The transmitter includes a DC/AC inverter circuit, a first inductor, and a first capacitor. The receiver includes an AC/DC rectifier circuit, a second inductor, and a second capacitor. Electric energy of the transmitter is transmitted to the receiver through electromagnetic induction between the first inductor and the second inductor. The AC/DC rectifier circuit is configured to rectify the electric energy transmitted by the transmitter to the receiver, and then supply electric energy to a load of the receiver.

The method includes:

the transmitter detects a value of a resonant frequency of the transmitter;

the transmitter detects a value of a coupling coefficient between the transmitter and the receiver;

the transmitter obtains a value of a constant-voltage operating frequency of the transmitter through calculation based on the resonant frequency and the coupling coefficient; and the transmitter controls an operating frequency of the DC/AC inverter circuit based on the constant-voltage operating frequency obtained through calculation.

In an implementation, the detecting a value of a coupling coefficient between the transmitter and the receiver includes:

the receiver detects a value of an output voltage of the AC/DC rectifier circuit;

the transmitter calculates a value of a first inductance based on the resonant frequency and a first capacitance;

the transmitter detects a value of a first current of the transmitter that passes through the first inductor at a first operating frequency; and the transmitter obtains the value of the coupling coefficient through calculation based on values of the output voltage of the AC/DC rectifier circuit, the first inductance, the first current, and the first operating frequency.

In an implementation, that the transmitter obtains the value of the coupling coefficient through calculation includes:

obtaining the value of the coupling coefficient through calculation based on values of the output voltage of the AC/DC rectifier circuit, the first inductance, the first current, the first operating frequency, and a calibration coefficient.

In an implementation, that the transmitter detects a value of a resonant frequency of the transmitter includes:

the transmitter obtains the resonant frequency of the transmitter through calculation based on an oscillation period of a voltage between the first capacitor and the first inductor.

In an implementation, the method further includes:

the receiver detects an output voltage of the receiver;

the transmitter determines that a value of a gain is not equal to a first threshold, where the gain is a ratio of the output voltage of the receiver to an input voltage of the transmitter; and the transmitter modulates, within a preset range, the constant-voltage operating frequency obtained through calculation, until the value of the gain is equal to the first threshold; and correspondingly, that the transmitter controls an operating frequency of the DC/AC inverter circuit based on the constant-voltage operating frequency obtained through calculation includes:

controlling the operating frequency of the DC/AC inverter circuit to be a modulated constant-voltage operating frequency.

In an implementation, that the transmitter controls an operating frequency of the DC/AC inverter circuit based on the constant-voltage operating frequency obtained through calculation includes: controlling the operating frequency of the DC/AC inverter circuit to be the constant-voltage operating frequency obtained through calculation.

In an implementation, the method further includes:

the receiver detects an output voltage of the receiver;

the transmitter determines that a value of a gain is not equal to a first threshold, where the gain is a ratio of the output voltage of the receiver to an input voltage of the transmitter; and the transmitter performs frequency sweeping within a preset range based on the constant-voltage operating frequency obtained through calculation, until the value of the gain is equal to the first threshold; and correspondingly, that the transmitter controls an operating frequency of the DC/AC inverter circuit based on the constant-voltage operating frequency obtained through calculation includes:

controlling the operating frequency of the DC/AC inverter circuit to be a modulated constant-voltage operating frequency, where the modulated constant-voltage operating frequency is a constant-voltage operating frequency obtained when the value of the gain is equal to the first threshold.

In an implementation, the transmitter further includes a DC/DC circuit, the DC/DC circuit is connected to the DC/AC inverter circuit in series, and the method further includes:

the receiver detects an output voltage of the receiver;

the transmitter determines that the constant-voltage operating frequency does not fall within an operating frequency range of the DC/AC inverter circuit;

the transmitter controls the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; and the transmitter regulates an output voltage of the DC/DC circuit until a value of a gain is equal to a first threshold, where the gain is a ratio of the output voltage of the receiver to an input voltage of the transmitter.

In an implementation, the method further includes:

the receiver detects an output voltage of the receiver;

the transmitter determines that the constant-voltage operating frequency obtained through calculation does not fall within an operating frequency range of the DC/AC inverter circuit;

the transmitter controls the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; and the transmitter adjusts a duty ratio of the DC/AC inverter circuit until a value of a gain is equal to a first threshold, where the gain is a ratio of the output voltage of the receiver to an input voltage of the transmitter.

According to a third aspect, a wireless electric energy transmission system may include a transmitter, a receiver, a first processor, and a first memory. The first processor is configured to control the transmitter. The transmitter includes a DC/AC inverter circuit, a first inductor, and a first capacitor that are connected in series. The receiver includes an AC/DC rectifier circuit, a second inductor, and a second capacitor that are connected in series. Electric energy of the transmitter is transmitted to the receiver through electromagnetic induction between the first inductor and the second inductor. The AC/DC rectifier circuit is configured to rectify the electric energy transmitted by the transmitter to the receiver. The first memory stores a computer program. After the computer program is invoked by the first processor, the steps performed by the transmitter in any one of the foregoing second aspect and the plurality of implementations are performed.

In an implementation, the system further includes a second processor and a second memory. The second processor is configured to control the receiver. The second memory stores a computer program. After the computer program is invoked by the second processor, the steps performed by the receiver in any one of the plurality of implementations of the foregoing second aspect are performed.

According to a fourth aspect, a non-transitory computer readable storage medium stores a computer program. A processor invokes the computer program to perform the steps performed by the transmitter in any one of the foregoing second aspect and the plurality of implementations.

According to a fifth aspect, a non-transitory computer readable storage medium stores a computer program. A processor invokes the computer program to perform the steps performed by the receiver in any one of the plurality of implementations of the foregoing second aspect.

According to a sixth aspect, a wireless electric energy transmission system includes a transmitter and a receiver. The transmitter includes a DC/AC inverter circuit, a first inductor, and a first capacitor that are connected in series. The receiver includes an AC/DC rectifier circuit, a second inductor, and a second capacitor that are connected in series. Electric energy of the transmitter is transmitted to the receiver through electromagnetic induction between the first inductor and the second inductor. The AC/DC rectifier circuit is configured to rectify the electric energy transmitted by the transmitter to the receiver. The inductor may also be referred to as a coil.

The transmitter is configured to:

perform frequency sweeping within an operating frequency range of the DC/AC inverter circuit, to determine a constant-voltage operating frequency of the transmitter, where the constant-voltage operating frequency of the transmitter is an operating frequency of the DC/AC inverter circuit of the transmitter, and the constant-voltage operating frequency is an operating frequency of the DC/AC inverter circuit that is obtained when an output voltage of the AC/DC rectifier circuit is independent of load of the receiver; and control an operating frequency of the DC/AC inverter circuit based on the constant-voltage operating frequency obtained through calculation.

In an implementation, the receiver is configured to detect an output voltage of the receiver; and the transmitter is configured to:

determine that a value of a gain is not equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in a no-load state;

modulate, within a preset range, the constant-voltage operating frequency obtained through calculation, until the value of the gain is equal to the first threshold, where the preset range is a range that is of small-range frequency modulation and that is set based on the constant-voltage operating frequency, the preset range is a sub interval of the operating frequency range of the DC/AC inverter circuit, and the small-range frequency modulation can improve accuracy of the constant-voltage operating frequency, thereby improving steadiness of an output voltage provided by the wireless electric energy transmission system; and control the operating frequency of the DC/AC inverter circuit to be a modulated constant-voltage operating frequency; in other words, control the DC/AC inverter circuit to operate at the modulated constant-voltage operating frequency.

In an implementation, the transmitter is configured to control the operating frequency of the DC/AC inverter circuit to be the constant-voltage operating frequency obtained through calculation.

In an implementation, the transmitter further includes a DC/DC circuit, the DC/DC circuit is connected to the DC/AC inverter circuit in series, and the DC/DC circuit is located at a previous stage of the DC/AC inverter circuit;

the receiver is configured to detect an output voltage of the receiver; and the transmitter is configured to:

determine that the constant-voltage operating frequency obtained through calculation does not fall within the operating frequency range of the DC/AC inverter circuit;

control the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; in other words, control the DC/AC inverter circuit to operate at an operating frequency corresponding to a limit value that is closer to the constant-voltage operating frequency obtained through calculation; and regulate an output voltage of the DC/DC circuit until a value of a gain is equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in a no-load state.

In an implementation, the receiver further includes a DC/DC circuit, the DC/DC circuit is connected to the AC/DC rectifier circuit in series, and the DC/DC circuit is located at a next stage of the AC/DC rectifier circuit;

the receiver is configured to detect an output voltage of the receiver; and the transmitter is configured to:

determine that the constant-voltage operating frequency obtained through calculation does not fall within the operating frequency range of the DC/AC inverter circuit;

control the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; and regulate an output voltage of the DC/DC circuit until a value of a gain is equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in a no-load state.

In an implementation, the receiver is configured to detect an output voltage of the receiver; and the transmitter is configured to:

determine that the constant-voltage operating frequency obtained through calculation does not fall within the operating frequency range of the DC/AC inverter circuit;

control the operating frequency of the DC/AC inverter circuit to be a limit value of the operating frequency range, where the limit value is a limit that is in an upper limit and a lower limit of the operating frequency range and that has a smaller difference with the constant-voltage operating frequency obtained through calculation; and adjust a duty ratio of the DC/AC inverter circuit until a value of a gain is equal to a first threshold, where the gain is a ratio of the output voltage of the AC/DC rectifier circuit of the receiver to an input voltage of the DC/AC inverter circuit of the transmitter, and a value of the first threshold of the gain may be 1 for the wireless electric energy transmission system in a no-load state. The duty ratio is a concept in a plurality of fields such as a radio frequency, a microwave circuit, a low-frequency alternating current, and a direct current, and indicates a ratio of operating time to total time in one period.

An operating manner of a wireless charging system commonly used by a terminal is as follows: performing constant-frequency and voltage-regulated operating at a fixed frequency or performing frequency-modulated operating in a frequency range to ensure that an output voltage is a set value, without adjusting an operating status based on position information. When load sharply changes, the system may break down or restarts. However, because a terminal device such as a mobile phone has a battery, the terminal device such as the mobile phone does not restart but the charging experience of a terminal user is reduced. When the operating manner of the wireless charging system commonly used by the terminal is applied to a scenario in which a receiver device has no battery, steady power supply to the receiver device cannot be ensured.

In a wireless charging scenario of a terminal, a distance between an inductor of a receiver and an inductor of a transmitter usually falls within a range of 3 mm to 8 mm. When the wireless electric energy transmission system is applied to a remote scenario, a distance between an inductor of a receiver and an inductor of a transmitter approximately falls within a range of 8 mm to 34 mm (a medium between the transmitter and the receiver is glass) or falls within a range of 50 mm to 300 mm (a medium between the transmitter and the receiver is a wall). Additionally, the embodiments may also be applied to a wireless charging scenario. According to the wireless electric energy transmission system, a relative position between a coil of a transmitter and a coil of a receiver is determined through online detection, and a constant-voltage operating frequency correlated with the relative position is determined: A constant output voltage of the receiver is implemented by using a characteristic that an output voltage of the receiver is independent of a load change during operating at the constant-voltage operating frequency; or an excellent dynamic load response of the output voltage of the receiver is implemented through operating in a state in which a frequency is modulated in a small frequency range near the constant-voltage operating frequency. The foregoing features of the wireless electric energy transmission system can ensure that the wireless electric energy transmission system stably operates, to avoid system breakdown or restart caused by a sharp load change. Especially, when a receiver device has no battery, the embodiments can still ensure steady power supply to the receiver device.

BRIEF DESCRIPTION OF THE DRAWINGS

FIG. 2A-1 is a schematic diagram of a structure of a wireless electric energy transmission system according to an embodiment;

FIG. 2A-2 shows a function relationship between a coil inductance and a relative position according to an embodiment;

FIG. 2A-3 shows a function relationship between a coupling coefficient and a relative position according to an embodiment;

FIG. 2A-4 shows a function relationship between a coil current and a relative position according to an embodiment;

FIG. 2A-5 shows a function relationship between system efficiency and a relative position according to an embodiment;

FIG. 4 is a schematic diagram of a structure of a wireless electric energy transmission system according to an embodiment;

FIG. 5 is a flowchart of detecting a resonant frequency and an inductance of a transmitter according to an embodiment;

DETAILED DESCRIPTION OF THE EMBODIMENTS

Figure 1:
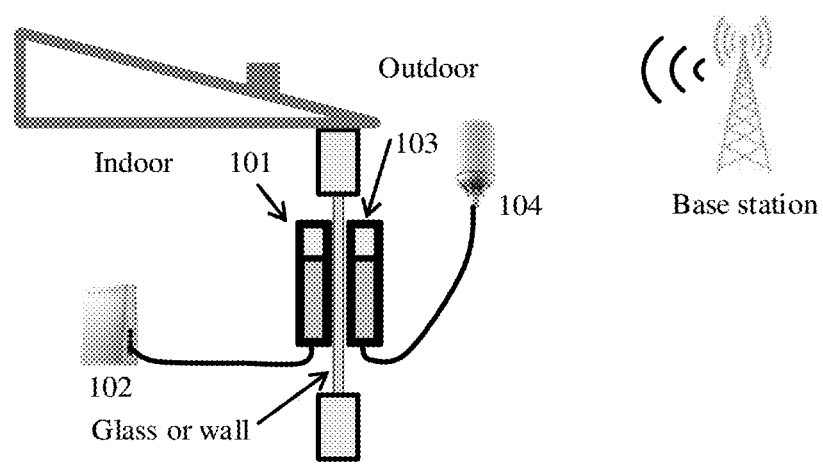
FIG. 1 is a schematic diagram of a structure of CPE according to an embodiment.

As shown in FIG. 1, an indoor unit may include a wireless power supply unit 101 and a load 102 (for example, a wireless/laser modem), an outdoor unit may include a wireless power receiving unit 103 and a load 104 (for example, a wireless/laser modem), and the indoor unit supplies power to the outdoor unit in a wireless manner. Electric energy is transmitted between the indoor unit and the outdoor unit by using the wireless power supply unit 101 and the wireless power receiving unit 103. In another implementation, the wireless power supply unit 101 is located in an outdoor unit, and the wireless power receiving unit 103 is located in an indoor unit, that is, the outdoor unit supplies electric energy to the indoor unit.

It should be noted that a wireless electric energy transmission system provided in the embodiments may be applied to a remote electric energy transmission scenario including an indoor unit and an outdoor unit and may be further applied to a wireless charging scenario. In the wireless charging scenario, the wireless power supply unit 101 is located in a wireless charger, the wireless power receiving unit 103 is located in an electronic device, and the wireless charger transmits electric energy to the electronic device by using the wireless power supply unit 101, to charge the electronic device. In other words, a transmitter is located in the wireless charger, and a receiver is located in the electronic device. The electronic device may be a terminal device, for example, any device that supports wireless charging, such as a mobile phone, a tablet computer, or a wearable device.

Figures 1, 2A:
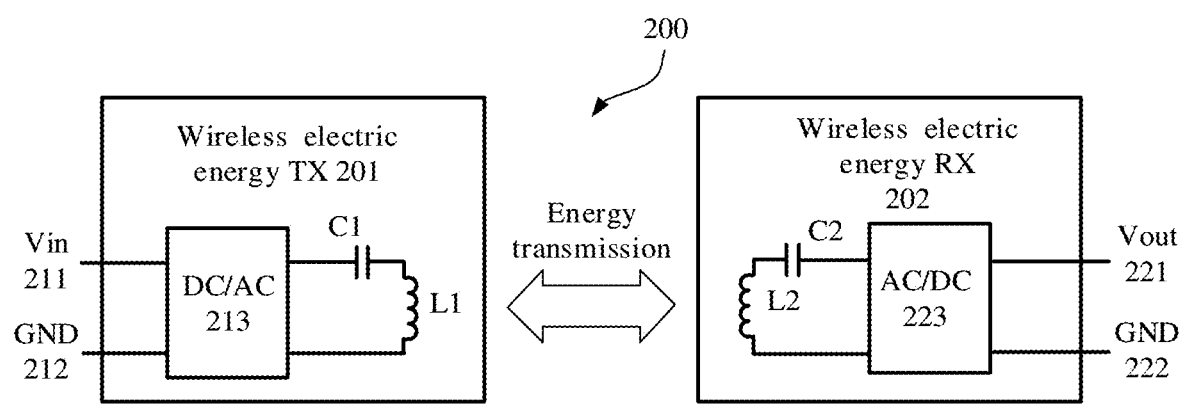

As shown in FIG. 2A-1, a wireless electric energy transmitter TX 201 in a wireless electric energy transmission system 200 is the wireless power supply unit 101, and a wireless electric energy receiver RX 202 in the wireless electric energy transmission system 200 is the wireless power receiving unit 103. Energy transmission between the transmitter TX 201 and the receiver RX 202 is implemented through electromagnetic induction between an inductor L1 and an inductor L2. The wireless electric energy transmission system means transmitting electric energy in a wireless manner.

The wireless electric energy transmitter TX 201 includes a resonant circuit formed by connecting a direct current/alternating current (DC/AC) inverter circuit 213, a capacitor C1, and the coil L1 in series. The DC/AC inverter circuit 213 may use a half-bridge or full-bridge topology. An end 211 of the wireless electric energy TX 201 may be connected to a load (for example, the load 102 in FIG. 1), and then connected to a power supply; or an end 211 of the wireless electric energy TX 201 may be directly connected to a power supply. Vin indicates an input voltage of the wireless electric energy TX, and GND 212 indicates a wire ground terminal.

The wireless electric energy TX 201 includes the DC/AC circuit 213, the capacitor C1, and the inductor L1. The DC/AC circuit 213 is connected to the capacitor C1 and the inductor L1 in series.

The wireless electric energy RX 202 includes an AC/DC circuit 223, a capacitor C2, and the inductor L2. The AC/DC circuit 223 is connected to the capacitor C2 and the inductor L2 in series.

The wireless electric energy receiver RX 202 includes a resonant circuit formed by connecting the alternating current/direct current (AC/DC) rectifier circuit 223, the capacitor C2, and the coil L2 in series. The AC/DC rectifier circuit may use a synchronous or diode rectification manner of a half-bridge or full-bridge topology. An end 221 of the wireless electric energy RX 202 may be connected to a load (for example, the load 104 in FIG. 1). Vout indicates an output voltage of the wireless electric energy RX, and GND indicates a wire ground terminal.

To ensure normal operating of the load connected to the receiver RX 202, the output voltage Vout of the receiver needs to be kept steady. In the conventional technology, a steady output voltage is implemented through loop control: When load of the receiver dynamically changes, an operating frequency of the transmitter is constantly modulated, so that the output voltage of the receiver is kept steady. However, a loop control response is slow. Therefore, when the load of the receiver dynamically changes, a power failure may occur in the wireless electric energy transmission system due to an untimely response.

In the embodiments, steady voltage output is implemented by using a circuit characteristic of a series resonant circuit.

The series resonant circuit is one of resonant circuits. In an alternating current circuit having an inductor L element (usually also referred to as a coil) and a capacitor C element, a voltage between two ends of the circuit and a current in the circuit usually have different phases. If a parameter or a power frequency of a circuit element (L or C) is adjusted, the voltage and the current may have a same phase, and the entire circuit presents to be purely resistive. A circuit that reaches this state is referred to as a resonant circuit. In a resonant state, a total impedance of a circuit reaches an extremum or approximately reaches the extremum. Depending on circuit connection, there are two types: a series resonant circuit and a parallel resonant circuit. The series resonant circuit has a frequency selection characteristic: When an input end is connected to a sinusoidal alternating current voltage source with a constant amplitude, if a frequency of an input voltage is changed, a signal amplitude of an output voltage of the series resonant circuit changes with a frequency of an input signal. When a frequency of the output voltage is a frequency $f_0$, the amplitude of the output voltage reaches a maximum value; or when a frequency of the output voltage is away from $f_0$, an output amplitude value of the output voltage progressively decreases. $f_0$ is referred to as a resonant frequency of the series resonant circuit. In this case, an inductor and a capacitor in the series resonant circuit exchange energy. This is equivalent to a conducting wire externally.

In an implementation, both the transmitter TX 201 and the receiver RX 202 in the wireless electric energy transmission system 200 are series resonant circuits. When the wireless electric energy transmission system operates at a frequency f, the wireless electric energy transmission system may present a constant-voltage output characteristic that the output voltage Vout is independent of the load of the receiver RX 202, so that a dynamic response requirement of the wireless electric energy transmission system can be met.

When the transmitter and the receiver in the wireless electric energy transmission system have a same coil inductance and resonant capacitance, that is, $L_1=L_2$ and $C_1=C_2$, the constant-voltage operating frequency f is defined as follows:

$$f = \frac{f_0}{\sqrt{1-k}},\qquad \text{(formula 1.1)}$$

where f0 is a resonant frequency of the transmitter TX, and k is a coupling coefficient between the inductor of the transmitter and the inductor of the receiver.

When the transmitter and the receiver have different inductances and capacitances, to ensure that a constant-voltage operating frequency exists in the wireless electric energy transmission system, the following relationship should be met between an inductance $L_1$ and a capacitance $C_1$ of the transmitter and an inductance $L_2$ and a capacitance $C_2$ of the receiver:

$L_1*C_1=L_2*C_2$

When the relationship is met, a definition of the constant-voltage operating frequency f is still shown in the formula 1.1.

In a circuit, a coupling coefficient indicates a coupling degree between elements, and a ratio of an actual mutual inductance (absolute value) between two inductor elements to a maximum limit value thereof is defined as a coupling coefficient. In the wireless electric energy transmission system, the coupling coefficient may indicate a proportion of energy received by the inductor L2 of the receiver to energy sent by the inductor L1 of the transmitter. A larger coupling coefficient indicates a larger proportion of the energy received by the inductor L2 of the receiver to the energy sent by the inductor L1 of the transmitter. The coupling coefficient is correlated with a distance between the inductor L1 of the transmitter and the inductor L2 of the receiver and is also correlated with a medium between the inductor L1 of the transmitter and the inductor L2 of the receiver. In the wireless electric energy transmission system, the distance between the inductor L1 of the transmitter and the inductor L2 of the receiver may be a thickness of glass or a wall, and a corresponding coupling coefficient change range is wider. This also poses a new challenge for system design. After a relative position between the transmitter and the receiver in the wireless electric energy transmission system is fixed, a constant-voltage operating frequency does not change. However, for a transmitter and a receiver in a same wireless electric energy transmission system, when a relative position between the transmitter and the receiver changes, a constant-voltage operating frequency accordingly changes. In actual use, the transmitter and the receiver are placed or installed at different relative positions. Therefore, the relative position between the transmitter and the receiver may be online tested, to obtain f0 and the coupling coefficient k, and then obtain the constant-voltage operating frequency. Further, f0 and the coupling coefficient k may be alternatively directly detected, to obtain the constant-voltage operating frequency. In addition to the resonant frequency f0 and the coupling coefficient k, the relative position between the transmitter and the receiver further affects various parameters of the wireless electric energy transmission system, such as system efficiency, a current that passes through the inductor of the transmitter, and a voltage (that is, an AC/DC output voltage) of the receiver.

Figures 2, 2A:
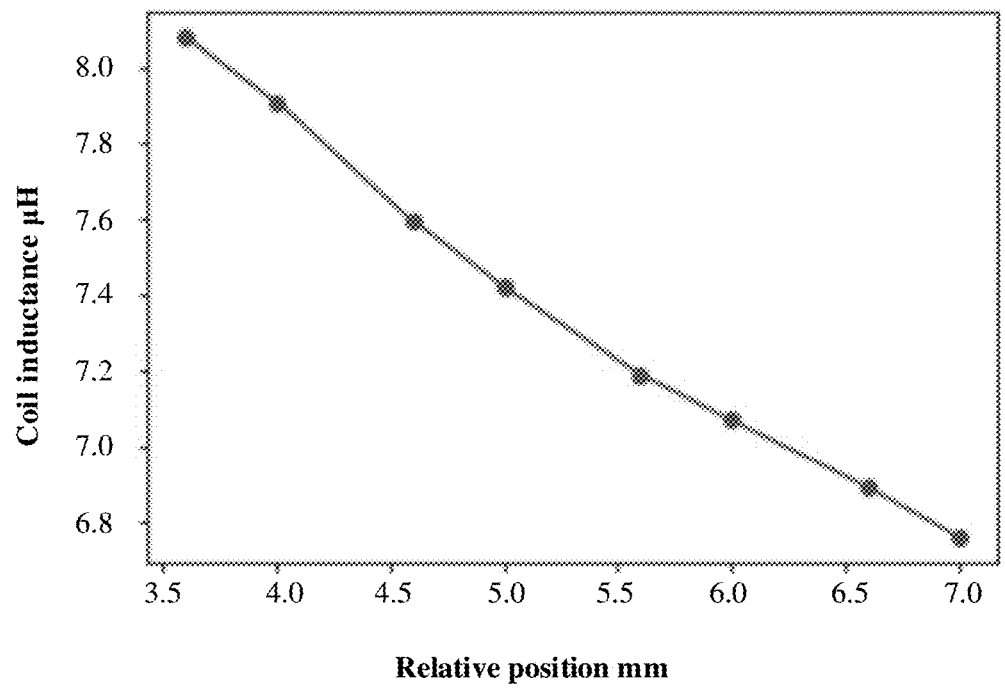
Figures 2, 2A, 3:
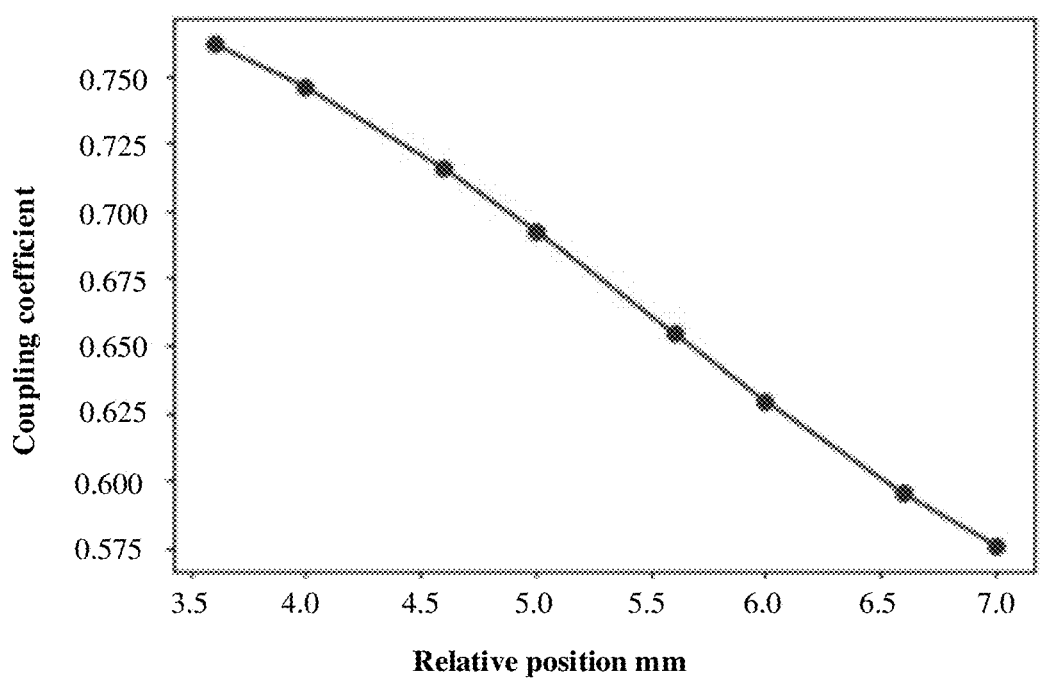

In an implementation, when the resonant frequency $f_0$ and the coupling coefficient k are inconveniently measured, a current distance between the transmitter and the receiver may be indicated by using the foregoing correlation quantities or a combination thereof, to obtain a corresponding constant-voltage operating point. FIG. 2A-2 shows a relationship in which a coil inductance changes with a relative position. FIG. 2A-3 shows a relationship in which a coupling coefficient changes with a relative position. FIG. 2A-4 shows a relationship in which a transmit coil current changes with a relative position. FIG. 2A-5 shows a relationship in which system efficiency changes with a relative position. Changes of these parameters with the position are all single-trend changes and can be used for current-position determining Similar to the series resonant circuit, another type of resonant circuit also has a constant-voltage operating frequency. In a wireless electric energy transmission system 300 shown in FIG. 2B, a transmitter is a parallel resonant circuit, and a receiver is a series resonant circuit.

The wireless electric energy transmitter TX in the wireless electric energy transmission system 300 is the wireless power supply unit, and the wireless electric energy receiver RX is the wireless power receiving unit 103. Energy transmission between the transmitter TX and the receiver RX is implemented through electromagnetic induction between an inductor L1 and an inductor L2. The wireless electric energy transmission system means transmitting electric energy in a wireless manner.

The wireless electric energy transmitter TX includes a direct current/alternating current (DC/AC) inverter circuit 313, a capacitor C1, the inductor L1, and an inductor L1'. The DC/AC inverter circuit 313 may use a half-bridge or full-bridge topology. An end 311 of the wireless electric energy TX may be connected to a load (for example, the load 102 in FIG. 1); or an end 311 of the wireless electric energy TX may be directly connected to a power supply. Vin indicates an input voltage of the wireless electric energy TX, and GND 312 indicates a wire ground terminal.

On a wireless electric energy TX side, the inductor L1 and the capacitor C1 are connected in parallel, one end of the inductor L1 and one end of the capacitor C1 are both connected to the inductor L1', and the inductor L1' is connected to an output end of the DC/AC circuit 313. The other end of the inductor L1 and the other end the capacitor C1 are both connected to an output end of the DC/AC circuit 313.

The wireless electric energy RX includes an AC/DC circuit 323, a capacitor C2, and the inductor L2. The AC/DC circuit 323 is connected to the capacitor C2 and the inductor L2 in series.

The wireless electric energy receiver RX includes a resonant circuit formed by connecting the alternating current/direct current (AC/DC) rectifier circuit 323, the capacitor C2, and the coil L2 in series. The AC/DC rectifier circuit may use a synchronous or diode rectification manner of a half-bridge or full-bridge topology. An end 321 of the wireless electric energy RX may be connected to a load (for example, the load 104 in FIG. 1). Vout indicates an output voltage of the wireless electric energy RX, and GND indicates a wire ground terminal.

$L_1'=L_1=L_2$ $C_1=C_2$

When the foregoing relationships are met, the wireless electric energy transmission system 300 has a constant-voltage operating frequency f:

$$f = \frac{1}{2\pi\sqrt{L_1 C_1}}$$

During operating at the constant-voltage operating frequency, a system gain G is as follows:

G=k, where k is a coupling coefficient between the inductor L1 of the transmitter and the inductor L2 of the receiver.

Figure 2B:
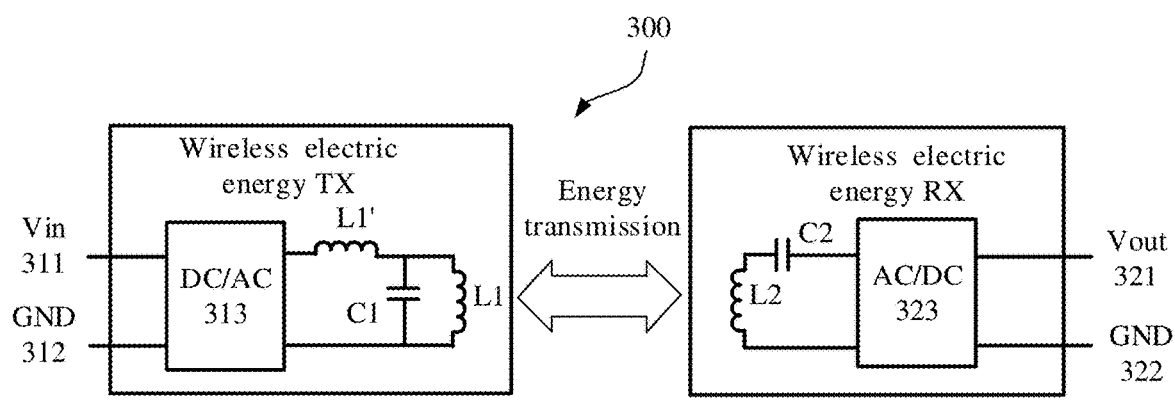
FIG. 2B is a schematic diagram of a structure of a wireless electric energy transmission system according to an embodiment.
Figure 3A:
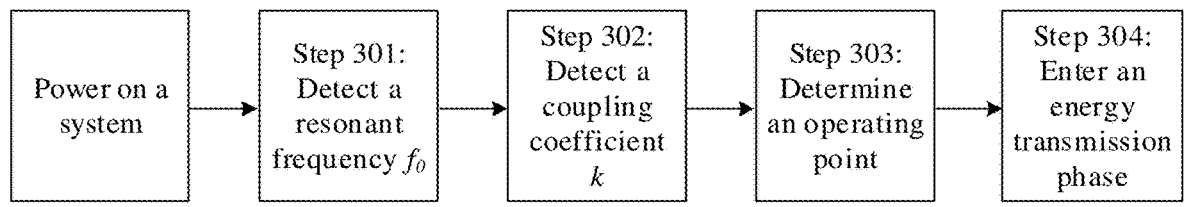
FIG. 3A is a schematic flowchart of a wireless electric energy transmission method according to an embodiment.

An embodiment provides a wireless electric energy transmission method. The wireless electric energy transmission method may be applied to the wireless electric energy transmission system shown in FIG. 2A-1, FIG. 2B, or FIG. 12. A procedure of the wireless electric energy transmission method is shown in FIG. 3A, and the method includes the following steps.

Step 301: Detect a resonant frequency $f_0$ of the transmitter and calculate an inductance $L_1$ of the transmitter.

First, the capacitor C1 of the transmitter is charged. Then, the capacitor C1 is discharged. Oscillation attenuation of a voltage Vcoil between the capacitor C1 and the tube L1 in a discharging process of the capacitor C1 is recorded. An oscillation period of the voltage Vcoil is calculated based on the oscillation attenuation of the voltage Vcoil, to obtain a frequency of the voltage Vcoil. The frequency is the resonant frequency $f_0$ of the transmitter.

Optionally, a value of a capacitance $C_1$ of the transmitter is recorded in advance, and then a value of the inductance $L_1$ of the transmitter is calculated based on the resonant frequency $f_0$ obtained through calculation.

Step 302: Detect a coupling coefficient k between the transmitter and the receiver.

A constant-voltage operating frequency f is determined by the resonant frequency $f_0$ of the transmitter and the coupling coefficient k between the transmitter and the receiver, and therefore is affected by a relative distance between the transmitter and the receiver in the wireless electric energy transmission system. After an indoor unit and an outdoor unit are installed and powered on, the relative distance between the transmitter and the receiver in the wireless electric energy transmission system is fixed. Therefore, after the installation, the coupling coefficient between the transmitter and the receiver in the wireless electric energy transmission system is fixed. The coupling coefficient between the transmitter and the receiver is correlated with an output voltage of the rectifier circuit of the receiver in a no-load state, a current of the inductor L1 of the transmitter, an inductance $L_1$ of the transmitter, and an operating frequency of the transmitter.

Step 303: Determine an operating point.

After the resonant frequency $f_0$ of the transmitter and the coupling coefficient k between the transmitter and the receiver are obtained through detection, the constant-voltage operating frequency f (the constant-voltage operating frequency f may also be referred to as a constant-voltage operating point) may be obtained through calculation according to the formula 1.1. The operating frequency is an alternating current frequency.

Optionally, the constant-voltage operating frequency may be calculated by the transmitter, may be calculated by the receiver, or may be calculated by a third-party device independent of the transmitter and the receiver. This is not limited herein.

Optionally, because deviations may exist in processes of detecting the resonant frequency $f_0$ and the coupling coefficient k, a deviation may exist between the constant-voltage operating frequency obtained through calculation based on detection results and an actual constant-voltage operating frequency. Therefore, accuracy of a calculation result of the constant-voltage operating frequency may be determined before an energy transmission phase is entered. The wireless electric energy transmission system detects DC/AC Vin of the transmitter and a rectified voltage Vrect of the receiver, to obtain, through calculation, a gain during operating at the constant-voltage operating frequency, and determines, based on this, whether an operating point needs to be modulated.

Optionally, a modulated operating point, namely, a modulated constant-voltage operating frequency, is determined through frequency sweeping. The wireless electric energy transmission system performs frequency sweeping by a step within a small range near the constant-voltage operating frequency obtained through calculation, to constantly modulate an operating frequency of the transmitter through frequency sweeping, and search for an operating frequency at which a gain reaches a threshold. The operating frequency at which the gain reaches the threshold is the modulated constant-voltage operating frequency. The gain is a ratio of an output voltage of the receiver to an input voltage of the transmitter and may also be referred to as a constant-voltage gain. The wireless electric energy transmission system may correspond to different gain thresholds in different operating states, and an operating status of the wireless electric energy transmission system may be a no-load state, a half-load state, or a full-load state. For example, a gain threshold of the wireless electric energy transmission system in the no-load state may be 1.

For example, the wireless electric energy transmission system is in the no-load state. The modulated constant-voltage operating frequency may be determined through frequency sweeping in the following two modes:

(1) if an actual gain is less than 1 when the transmitter operates by using, as an operating frequency, the constant-voltage operating frequency obtained through calculation, decreasing the operating frequency by a step starting from the constant-voltage operating frequency obtained through calculation, to search for a corresponding operating frequency obtained when the gain is 1; or if an actual gain is greater than 1 when the transmitter operates by using, as an operating frequency, the constant-voltage operating frequency obtained through calculation, increasing the operating frequency by a step starting from the constant-voltage operating frequency obtained through calculation, to search for a corresponding operating frequency obtained when the gain is 1; and (2) within a frequency range near the constant-voltage operating frequency obtained through calculation, gradually decreasing the frequency by a step starting from an upper limit of the frequency range, to search for a corresponding operating frequency obtained when a gain is 1.

Step 304: Enter the energy transmission phase.

After the foregoing parameter detection is completed and the constant-voltage operating frequency is obtained through frequency sweeping, open-loop operating may be performed in the energy transmission phase. An operating frequency of the wireless electric energy transmission system is controlled to be the operating point determined in step 303, that is, a frequency of an alternating current that is output by the DC/AC circuit 213 of the transmitter is controlled to be maintained at the constant-voltage operating frequency f. Because an operating frequency of the transmitter is maintained at the constant-voltage operating frequency f, the wireless electric energy transmission system may present a constant-voltage output characteristic that the output voltage Vout of the receiver is independent of load of the receiver RX 202. Therefore, the output voltage of the receiver in the wireless electric energy transmission system does not greatly change due to a load change of the receiver, and a dynamic response requirement of the wireless electric energy transmission system can also be met.

Figures 2, 2A, 3, 4:
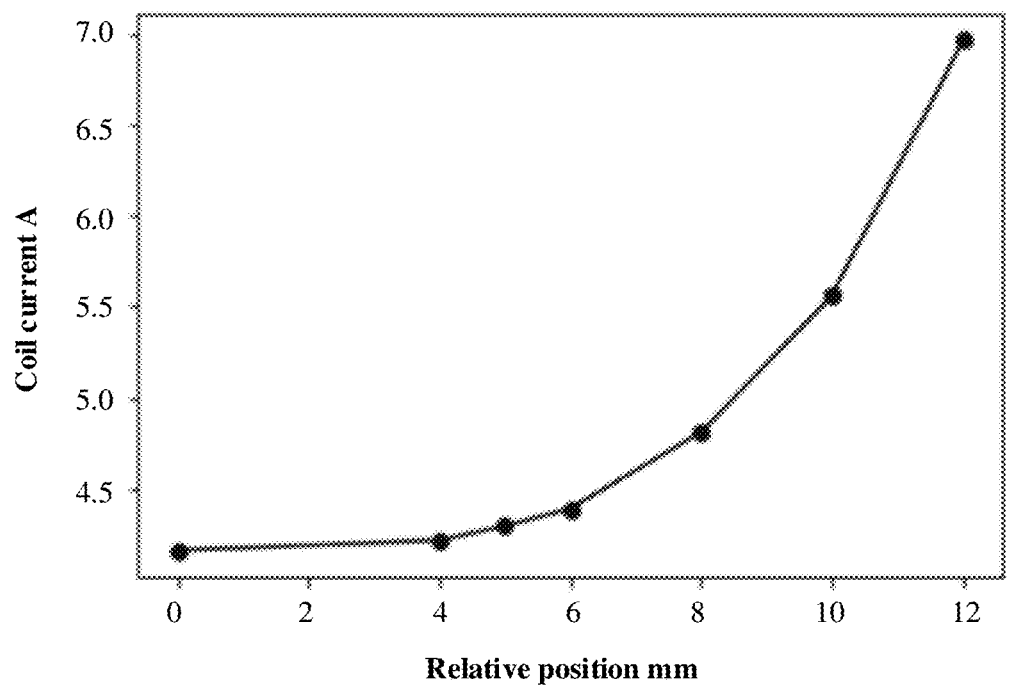

FIG. 4 is a schematic diagram of a wireless electric energy transmission system according to an embodiment. A process of detecting a resonant frequency occurs on a transmitter side. FIG. 4 describes a structure of the DC/AC circuit 213 in the wireless electric energy TX in FIG. 2A-1. For a wireless electric energy RX side, only the inductor $L_2$ is displayed in FIG. 4, and other parts are not shown in the figure. The DC/AC circuit 213 in FIG. 4 includes four switches: S1 to S4. S1 to S4 may be metal-oxide semiconductor (MOS) transistors.

Figures 2, 2A, 3, 4, 5:
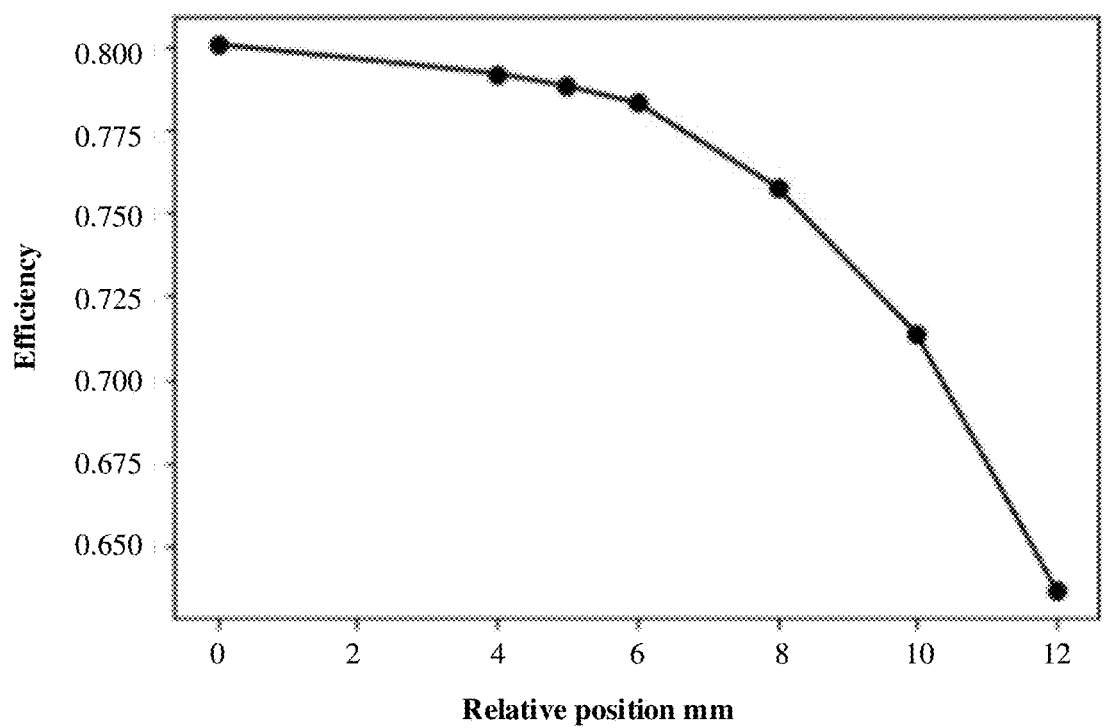

For step 301, FIG. 5 is a flowchart of detecting a resonant frequency and an inductance of a transmitter. Step 301 may include the following steps.

Step 401: Supply a direct current voltage to a full-bridge bus of the transmitter, and turn on S1 and S4, to charge the capacitor C1.

After the transmitter is powered on, S1 and S4 are controlled to be turned on. In this case, S1 and S4 are closed, and S2 and S3 are open. The direct current voltage V1 is supplied to the full-bridge bus of the transmitter, to charge the capacitor C1. In this case, the receiver may keep disconnected from the load. The transmitter may send a signal to the receiver. The signal is used to indicate a processor of the receiver to control the load of the receiver to keep at a disconnected state.

Step 402: Turn off S1, and close S2.

When the transmitter is in a steady state, the transmitter controls S1 to be turned off, and controls S2 to be turned on.

In this case, S3 still keeps open, and S4 still keeps closed. A processor of the transmitter may send a control signal to control closing and opening of the switches. L1, C1, S2, and S4 form a loop, electric energy stored in the capacitor C1 is to be released in the loop. When a voltage between two ends of the capacitor C1 of the transmitter does not change or changes at a rate lower than a threshold, the transmitter is in the steady state.

Step 403: Obtain the resonant frequency $f_0$ of the transmitter through calculation based on oscillation attenuation of a voltage Vcoil between the capacitor C1 and the inductor L1.

In a process of discharging the capacitor C1 in the loop formed by L1, C1, S2, and S4, the voltage Vcoil between the capacitor C1 and the inductor L1 attenuates with time, and an oscillation attenuation status of the voltage Vcoil may be shown on a right side in FIG. 4.

A value of the voltage Vcoil at each moment is compared with a set value in a comparator. Each time the value of the voltage Vcoil of an oscillation waveform reaches the set value in the comparator, the comparator is inverted once, that is, the voltage Vcoil completes one time of oscillation. A quantity of times that the comparator is inverted within a time period is calculated, to know an oscillation frequency of the voltage Vcoil. The oscillation frequency of the voltage Vcoil is the resonant frequency $f_0$ of the transmitter. The oscillation period of the voltage Vcoil is a time difference between two consecutive times of inversion, and the resonant frequency $f_0$ of the transmitter is a reciprocal of the oscillation period of the voltage Vcoil. Assuming that it is detected, at a moment T1, that the voltage Vcoil reaches the set value in the comparator, and it is consecutively detected, at a moment T2, that the voltage Vcoil reaches the set value in the comparator, a difference between T1 and T2 is the oscillation period of the voltage Vcoil.

Optionally, a counter is disposed in the processor of the transmitter. Each time the value of the voltage Vcoil of the oscillation waveform reaches the set value in the comparator, the counter increases a quantity of counting times, and a time difference between two times of counting is an oscillation period of the oscillation waveform. A reciprocal of the oscillation period is the oscillation frequency of the voltage Vcoil, and the oscillation frequency of the voltage Vcoil is the resonant frequency $f_0$ of the transmitter.

Step 404: Calculate the inductance $L_1$ of the transmitter.

Because the value of the capacitance $C_1$ of the transmitter is known, the transmitter may obtain the inductor $L_1$ through calculation based on the resonant frequency $f_0$ of the transmitter that is obtained through calculation:

$$L_1 = \frac{1}{(2\pi f_0)^2 C_1}$$

Figure 6:
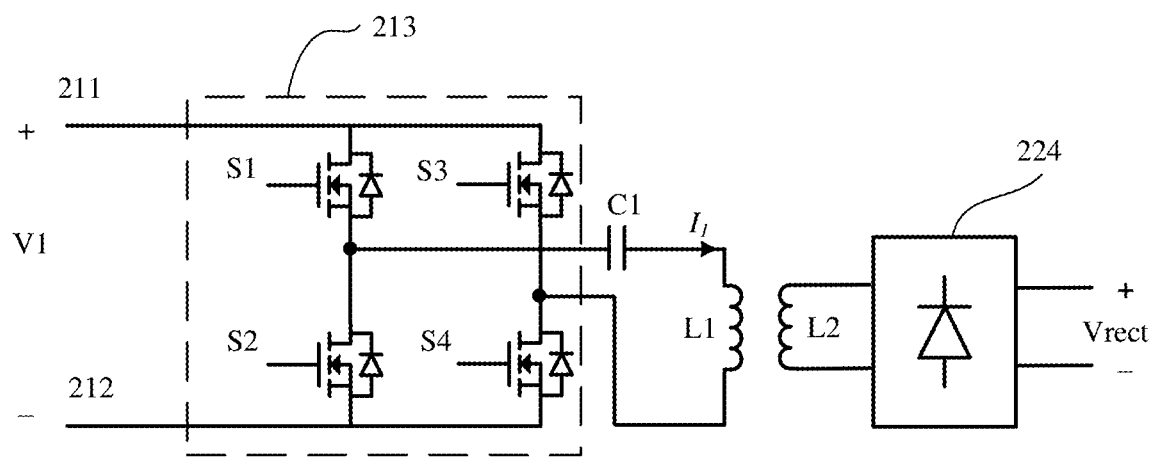
FIG. 6 is a schematic diagram of a structure of a wireless electric energy transmission system according to an embodiment.

FIG. 6 describes a structure of the DC/AC circuit 213 in the wireless electric energy TX in FIG. 2A-1. The DC/AC circuit 213 in FIG. 6 includes four switches: S1 to S4. S1 to S4 may be metal-oxide semiconductor (MOS) transistors. A rectifier circuit 224 in FIG. 6 includes the AC/DC circuit 223 and the capacitor C2 in FIG. 2A-1, and a value of a voltage that is output by the rectifier circuit 224 is $V_{rect}$.

Figure 7:
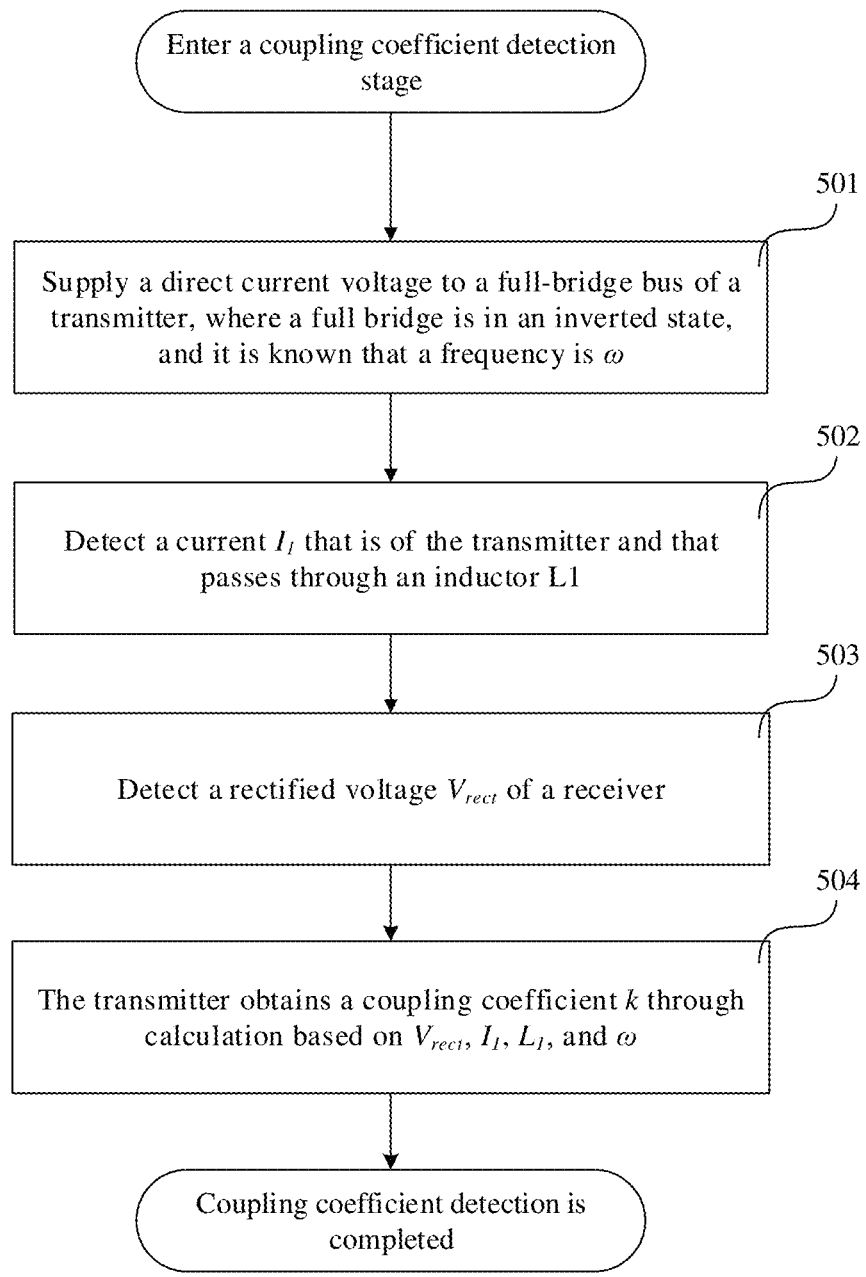
FIG. 7 is a flowchart of detecting a coupling coefficient according to an embodiment.

For step 302, FIG. 7 shows a procedure of detecting a coupling coefficient according to an embodiment. This step may include the following steps.

Step 501: Set the transmitter to operate at an operating frequency ω.

A direct current voltage V1 is supplied to a full-bridge bus of the transmitter, so that the DC/AC circuit 213 enters an inverted operating state. The operating frequency of the transmitter is set to ω, and a load status of the receiver is set to one of a no-load state, a light-load state, or a fixed load state. The operating frequency of the transmitter is a frequency of an alternating current that is output by the DC/AC circuit 213 of the transmitter.

Step 502: The transmitter detects a current $I_1$ that passes through the inductor L1 of the transmitter.

A processor of the transmitter may detect, by using a detection circuit, the current $I_1$ that passes through the inductor L1 of the transmitter.

Step 503: The receiver detects a rectified voltage $V_{rect}$.

Electric energy is transmitted from the transmitter to the receiver through energy transmission between the inductor L1 and the inductor L2. After receiving the electric energy, the inductor L2 of the receiver inputs the electric energy to the rectifier circuit 224. A processor of the receiver detects the output voltage $V_{rect}$ of the rectifier circuit 224.

Further, the receiver may send a value of the rectified voltage $V_{rect}$ obtained through detection to the transmitter.

Step 504: The transmitter obtains the coupling coefficient through calculation based on $V_{rect}$, $L_1$, $I_1$, and ω.

The coupling coefficient k is obtained through calculation based on the output voltage $V_{rect}$ of the receiver, the operating frequency ω of the transmitter, the inductance $L_1$ of the transmitter that is obtained through calculation, and the current $I_1$ that passes through the inductor L1 of the transmitter:

$$k = \frac{V_{rect}}{\omega L_1 I_1}$$

Optionally, the coupling coefficient k is as follows:

$$k = \frac{V_{rect}}{\omega L_1 I_1} \cdot \alpha,$$

where the coefficient α is a calibration coefficient, and a value of the coefficient α may be $\pi/(2\sqrt{2})$.

An open-circuit alternating current voltage is required for calculating the coupling coefficient. However, in actual test, $V_{rect}$ is a direct current voltage. Therefore, a calibration coefficient is required.

In an embodiment, after a constant-voltage operating point (constant-voltage operating frequency) is determined, if the determined constant-voltage operating frequency is an upper limit of an operating frequency range of the DC/AC circuit or exceeds the upper limit, in an implementation, the DC/AC circuit may be controlled to operate at the operating frequency upper limit, and a duty ratio may be adjusted, so that the system covers a larger distance range; or in another implementation, a previous-stage DC/DC circuit is added to the transmitter or a next-stage DC/DC circuit is added to the receiver, so that the system covers a larger distance range. The determined constant-voltage operating frequency may be a constant-voltage operating frequency obtained through calculation or may be an operating frequency obtained by modulating the constant-voltage operating frequency obtained through calculation, that is, a modulated constant-voltage operating frequency.

In another embodiment, considering impact of a load change of the receiver on a system gain, an actual operating frequency of the DC/AC inverter circuit is modulated within a range of a determined constant-voltage operating frequency, and a processor of the transmitter controls the DC/AC inverter circuit to modulate the actual operating frequency within a small range of the determined constant-voltage operating frequency. The frequency modulation range causes a gain range of the wireless electric energy transmission system to fall within a gain threshold range, for example, a range of 0.9 to 1.2 (which may include the two endpoint values: 0.9 and 1.2).

Figure 3B:
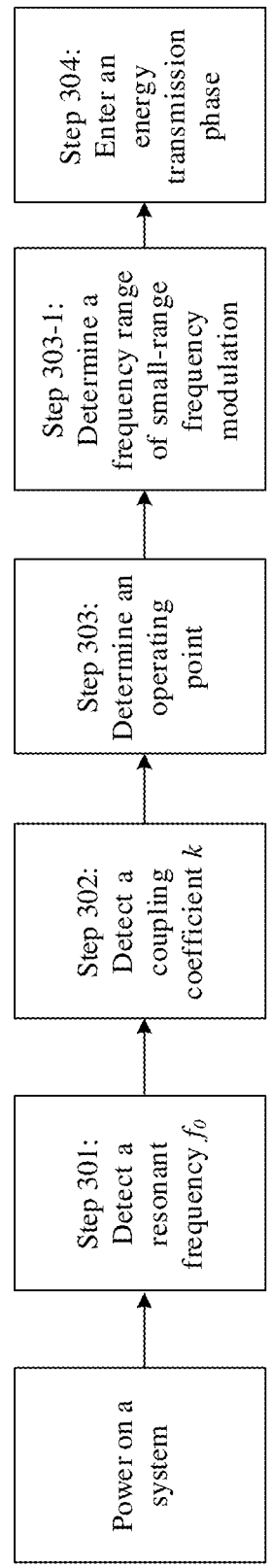
FIG. 3B is a schematic flowchart of a wireless electric energy transmission method according to an embodiment.

As shown in FIG. 3B, after step 303, the method further includes step 303-1: Determine a frequency range of small-range frequency modulation.

A frequency range (fmin2, fmax2) of small-range frequency modulation is determined. The range of the small-range frequency modulation is a sub interval of an operating frequency range (fmin1, fmax1) of the DC/AC inverter circuit. There are two manners of determining the frequency range of the small-range frequency modulation: One manner is obtaining, based on the operating point determined in step 303, the frequency range of the small-range frequency modulation through calculation according to a preset algorithm; and the other manner is obtaining the frequency range of the small-range frequency modulation through small-range frequency sweeping in step 303.

Figure 3C:
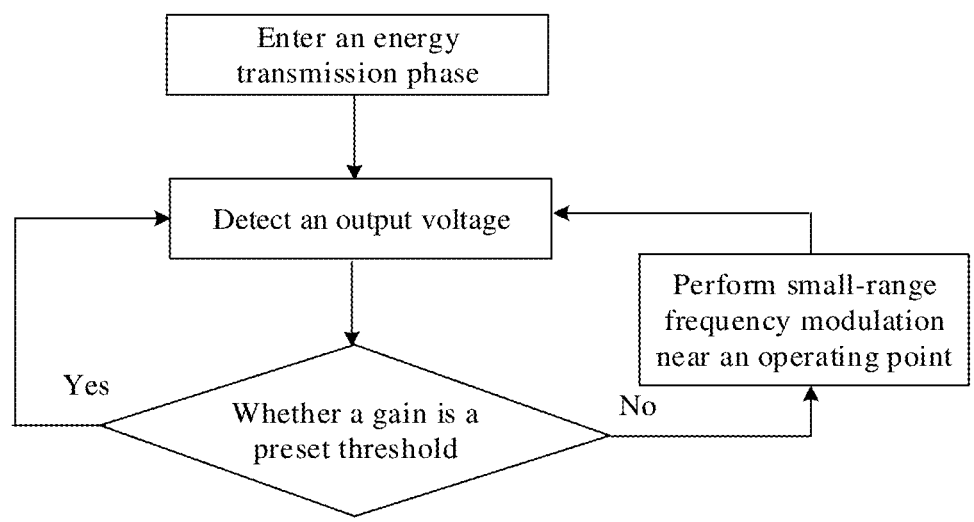
FIG. 3C is a schematic flowchart of a wireless electric energy transmission method according to an embodiment.
Figure 4:
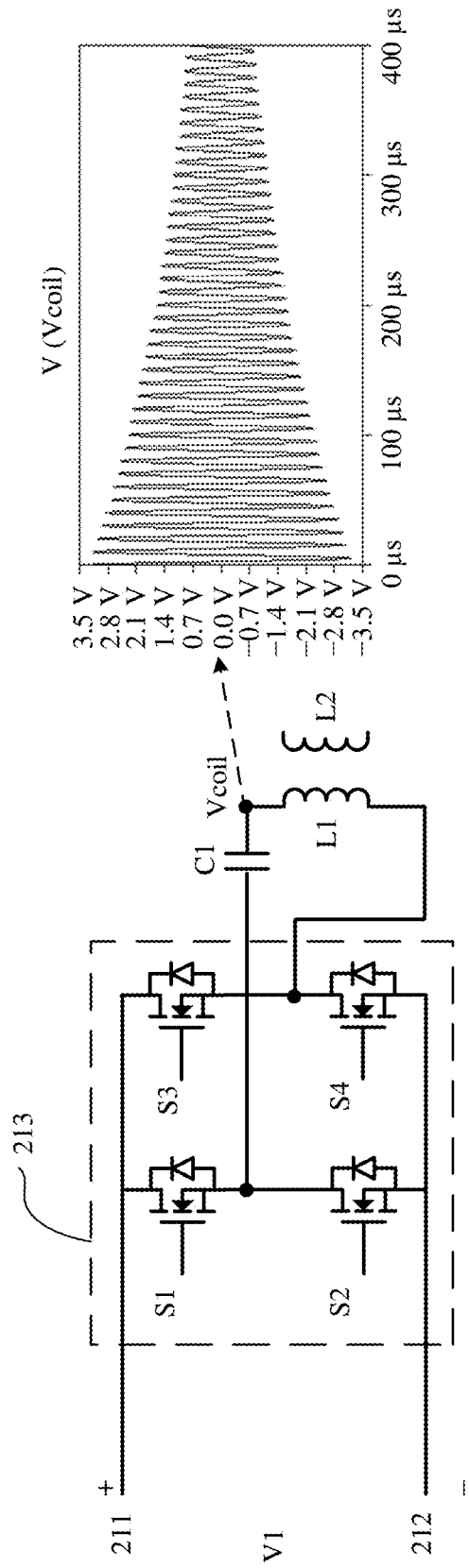
Figure 5:
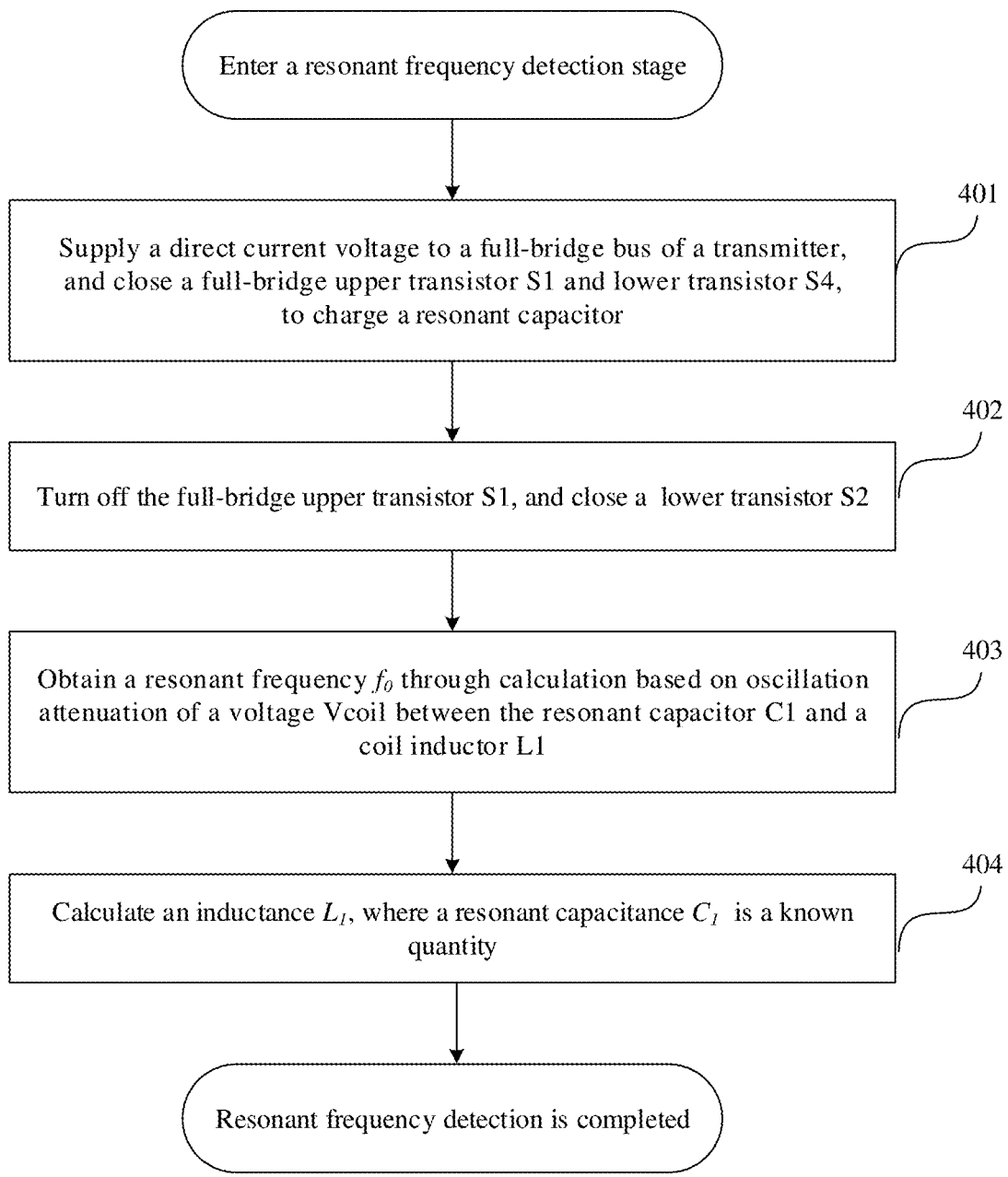

After entering the energy transmission phase, a processor of the receiver persistently or periodically detects an output voltage of the AC/DC circuit of the receiver and sends a value of the detected output voltage to the transmitter. The processor of the transmitter calculates a value of a gain based on an input voltage of the transmitter and determines whether the gain is a preset threshold. If the gain is the preset threshold, the transmitter performs no operation, and returns to output voltage detection. If the gain is not the preset threshold, the transmitter controls an operating frequency of the DC/AC circuit to be modulated within a small range of the operating point, so that the voltage gain reaches the preset threshold. For a schematic flowchart, see the following FIG. 3C.

Figure 8:
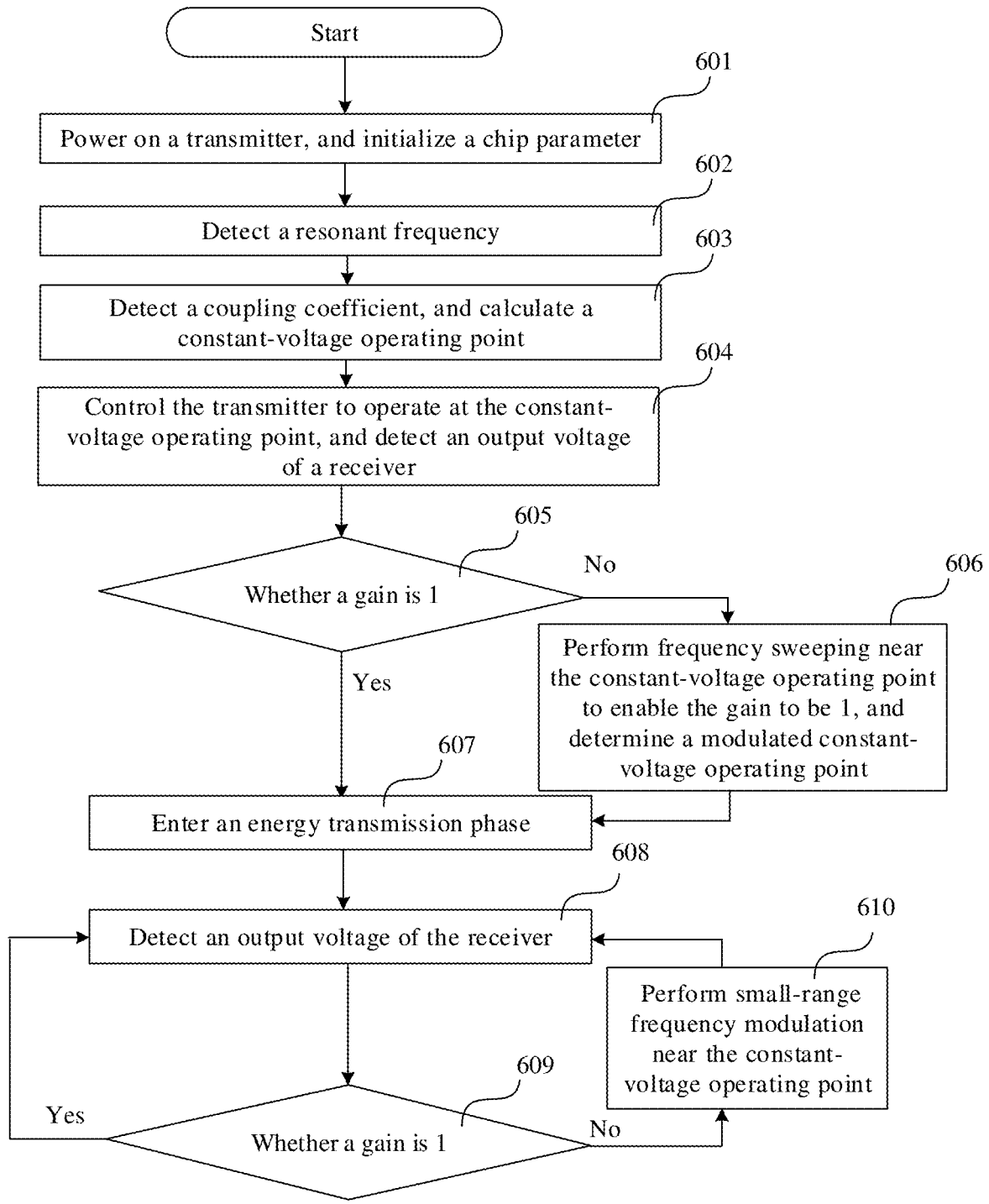
FIG. 8 is a schematic flowchart of a wireless electric energy transmission method according to an embodiment.

In another embodiment, a wireless electric energy transmission method may be applied to the wireless electric energy transmission system shown in FIG. 2A-1, FIG. 2B, or FIG. 12. A procedure of the wireless electric energy transmission method is shown in FIG. 8, and the method includes the following steps.

Step 601: Power on the transmitter and initialize a chip parameter.

After the transmitter in the wireless electric energy transmission system is powered on, a processor of the transmitter performs initialization.

Step 602: Detect a resonant frequency.

For steps in which the transmitter detects the resonant frequency, refer to steps 401 to 404. When the receiver keeps disconnected from the load, the processor of the transmitter first controls closing and opening of switches in the DC/AC circuit 213 to control the capacitor C1 to be charged, and then controls closing and opening of the switches in the DC/AC circuit 213 to control electric energy in the capacitor C1 to be released. In a process of discharging the capacitor C1, the processor of the transmitter detects a voltage Vcoil between the capacitor C1 and the inductor L1 of the transmitter, and calculates an oscillation frequency of the voltage Vcoil, that is, obtains the resonant frequency $f_0$ of the transmitter. Further, the processor of the transmitter obtains a value of an inductance $L_1$ of the transmitter through calculation based on the resonant frequency $f_0$ of the transmitter that is obtained through calculation and a known capacitance $C_1$ of the transmitter.

Step 603: Detect a coupling coefficient and calculate a constant-voltage operating point.

For a procedure of detecting the coupling coefficient, refer to the foregoing steps 501 to 504.

First, the processor of the transmitter controls a frequency of an alternating current that is output by the DC/AC circuit 213 of the transmitter to be an operating frequency ω, and a processor of the receiver controls the receiver to be in one of a no-load state, a light-load state, or a fixed load state. Next, the processor of the transmitter detects a current $I_1$ that passes through the inductor L1 of the transmitter. Electric energy is transmitted from the transmitter to the receiver by using the inductor L1 and the inductor L2. The receiver inputs, to the rectifier circuit 224 of the receiver, an alternating current transmitted through electromagnetic induction between the inductor L1 and the inductor L2, to output a direct current to the load of the receiver. The processor of the receiver detects an output voltage $V_{rect}$ of the rectifier circuit and sends a value of the output voltage $V_{rect}$ to the transmitter. Finally, the processor of the transmitter obtains the coupling coefficient through calculation based on the output voltage $V_{rect}$ sent by the receiver, the inductance $L_1$ of the transmitter, the current $I_1$ detected by the transmitter, and the operating frequency ω of the transmitter.

Further, the processor of the transmitter obtains, based on the resonant frequency $f_0$ of the transmitter that is obtained through calculation and the coupling coefficient k between the transmitter and the receiver, the constant-voltage operating point f (constant-voltage operating frequency) through calculation according to the formula 1.1.

Step 604: Control the transmitter to operate at the constant-voltage operating point and detect an output voltage of the receiver.

The processor of the transmitter controls a frequency of an alternating current that is output by the DC/AC circuit 213 of the transmitter to be a value of the constant-voltage operating point. In addition, the processor of the receiver detects an output voltage of the rectifier circuit 224 (or the AC/DC circuit 223) of the receiver and sends a value of the output voltage to the transmitter.

Step 605: Determine whether a gain is 1.

The processor of the transmitter obtains the gain through calculation based on a ratio of the output voltage of the receiver to an input voltage of the transmitter and determines whether the gain is 1.

If determining that the gain is not 1, the processor of the transmitter performs step 606. If determining that the gain is 1, the processor of the transmitter performs step 607.

Step 606: Perform frequency sweeping near the constant-voltage operating point to enable the gain to reach 1 and determine a modulated constant-voltage operating point.

The processor of the transmitter modulates the constant-voltage operating point based on the value of the constant-voltage operating point obtained through calculation and determines the modulated constant-voltage operating point. When the transmitter operates at the modulated constant-voltage operating point, a ratio (gain) of an output voltage of the receiver to the input voltage of the transmitter is 1.

Step 607: Enter an energy transmission phase.

The processor of the transmitter controls a frequency of an alternating current that is output by the DC/AC circuit 213 to be a value of the modulated constant-voltage operating point, or the processor controls a frequency of an alternating current that is output by the DC/AC circuit 213 to be still the value of the constant-voltage operating point determined in step 603. Electric energy that is output by the transmitter is transmitted to the receiver through electromagnetic induction between the inductor L1 and the inductor L2. The receiver supplies electric energy to the load of the receiver after performing rectification by using the AC/DC circuit. In this case, an operating frequency of the transmitter is the constant-voltage operating frequency, the wireless electric energy transmission system presents a constant-voltage characteristic, and an output voltage of the receiver does not change due to a load change of the receiver.

Step 608: Detect an output voltage of the receiver.

In the energy transmission phase, the processor of the receiver persistently or periodically detects an output voltage of the AC/DC circuit of the receiver and sends a value of the detected output voltage to the transmitter.

Step 609: Determine whether a gain is 1.

The processor of the transmitter calculates a value of the gain based on a ratio of the output voltage of the receiver to the input voltage of the transmitter and determines whether the gain is 1.

If determining that the gain is not 1, the processor of the transmitter performs step 610: Perform small-range frequency modulation near the constant-voltage operating point. For an implementation of modulating the constant-voltage operating point, refer to step 606 and step 303.

If determining that the gain is 1, the processor of the transmitter returns to step 608.

Figure 9:
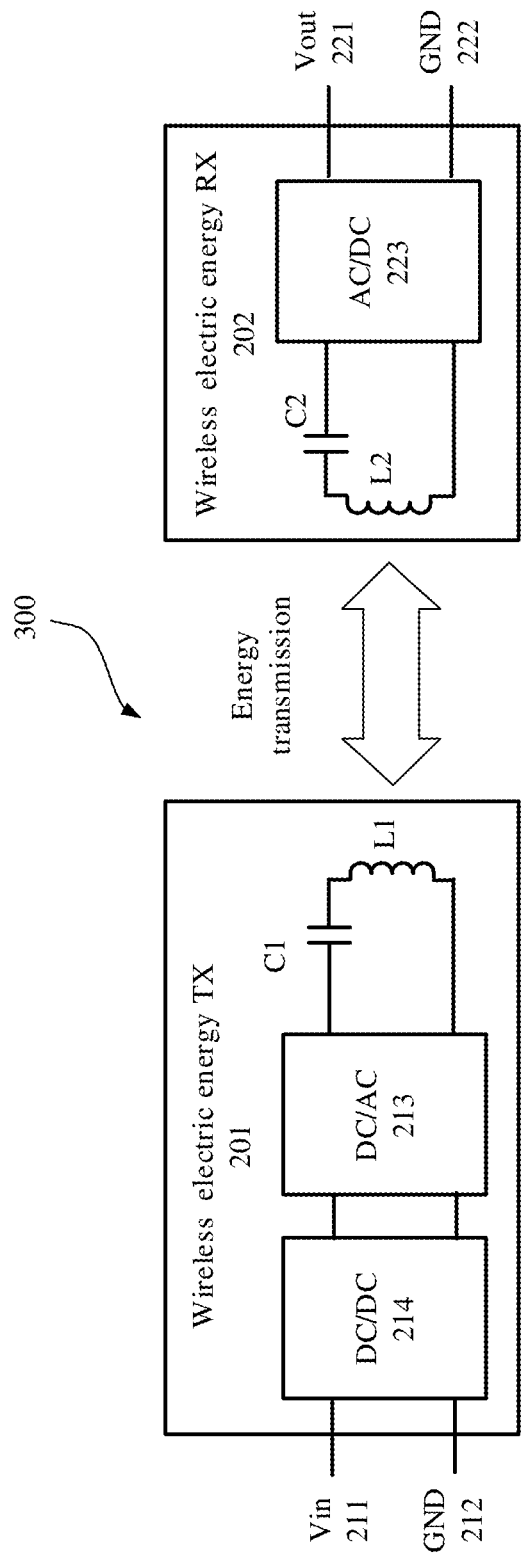
FIG. 9 is a schematic diagram of a structure of a wireless electric energy transmission system according to an embodiment.

An embodiment provides a wireless electric energy transmission system. FIG. 9 is a schematic diagram of a structure of a wireless electric energy transmission system 300. The wireless electric energy transmission system 300 is obtained by adding a DC/DC circuit 214 to the wireless electric energy TX 201 in the wireless electric energy transmission system 200 shown in FIG. 2A-1.

The DC/DC circuit 214 may be located in a previous stage of the DC/AC circuit 213 (as shown in FIG. 9) or may be located in a next stage of the DC/AC circuit 213. The DC/DC circuit 214, the DC/AC circuit 213, the capacitor C1, and the inductor L1 are connected in series.

A circuit usually has an operating frequency range limitation. For example, a usual operating frequency range of a wireless charging Qi solution is 110 kHz to 148.5 kHz. However, in the wireless electric energy transmission system, a constant-voltage operating frequency depends on an inductance $L_1$ of the transmitter, a capacitance $C_1$ of the transmitter, and a coupling coefficient k between the transmitter and the receiver. The inductance $L_1$ and the coupling coefficient k are affected by an installation distance between the transmitter and the receiver. Therefore, when the installation distance between the transmitter and the receiver changes within a range, the constant-voltage operating frequency of the system also accordingly changes, and the constant-voltage operating frequency may fall outside a specified operating frequency range.

As shown in FIG. 9, the DC/DC circuit 214 is added based on FIG. 2A-1. When a constant-voltage operating frequency finally obtained by a processor of the transmitter through calculation exceeds an operating frequency range, the processor of the transmitter modulates an operating frequency of the DC/AC circuit 213 of the transmitter to an upper limit value or a lower limit value that is of the operating frequency range and that is closer to the constant-voltage operating frequency obtained through calculation. The transmitter may further regulate an output voltage of the DC/DC circuit 214, so that a value of a gain of the energy transmission phase is kept equal to 1.

Figure 10:
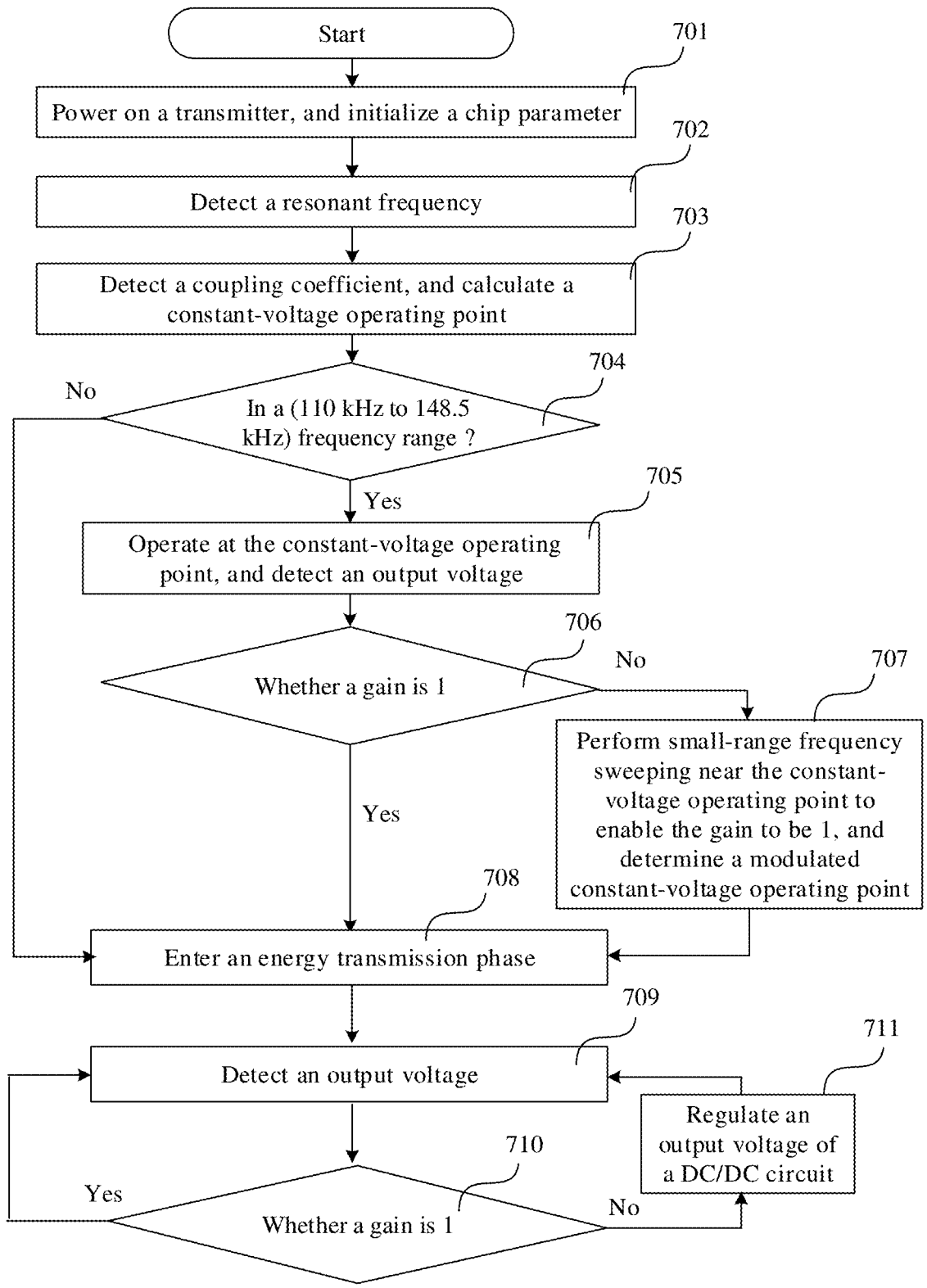
FIG. 10 is a schematic flowchart of a wireless electric energy transmission method according to an embodiment.

A wireless electric energy transmission method may be applied to the wireless electric energy transmission system shown in FIG. 2A-1, FIG. 2B, or FIG. 12. A procedure of the wireless electric energy transmission method is shown in FIG. 10, and the method includes the following steps.

Step 701: Power on the transmitter and initialize a chip parameter.

After the transmitter in the wireless electric energy transmission system is powered on, a processor of the transmitter performs initialization.

Step 702: Detect a resonant frequency.

For steps in which the transmitter detects the resonant frequency, refer to steps 401 to 404 or step 602.

Step 703: Detect a coupling coefficient and calculate a constant-voltage operating point.

For a procedure of detecting the coupling coefficient, refer to the foregoing steps 501 to 504 or step 603.

Step 704: Determine whether the constant-voltage operating point falls within an operating frequency range of the circuit.

If the constant-voltage operating point falls within the range, the transmitter performs step 705. If the constant-voltage operating point does not fall within the range, the transmitter performs step 708.

Step 705: Control the transmitter to operate at the constant-voltage operating point and detect an output voltage of the receiver.

The processor of the transmitter controls a frequency of an alternating current that is output by the DC/AC circuit 213 of the transmitter to be a value of the constant-voltage operating point. In addition, a processor of the receiver detects an output voltage of the rectifier circuit 224 (or the AC/DC circuit 223) of the receiver and sends a value of the output voltage to the transmitter.

Step 706: Determine whether a gain is 1.

The processor of the transmitter obtains the gain through calculation based on a ratio of the output voltage of the receiver to an input voltage of the transmitter and determines whether the gain is 1.

If determining that the gain is not 1, the processor of the transmitter performs step 707. If determining that the gain is 1, the processor of the transmitter performs step 708.

Step 707: Perform frequency sweeping near the constant-voltage operating point to enable the gain to reach 1 and determine a modulated constant-voltage operating point.

The processor of the transmitter modulates the constant-voltage operating point based on the value of the constant-voltage operating point obtained through calculation and determines the modulated constant-voltage operating point. When the transmitter operates at the modulated constant-voltage operating point, a ratio (gain) of an output voltage of the receiver to the input voltage of the transmitter is 1.

Step 708: Enter an energy transmission phase.

If determining, in step 704, that the constant-voltage operating point obtained through calculation does not fall within the operating frequency range of the transmitter, the processor of the transmitter controls an operating frequency of the transmitter to be a value that is in an upper limit and a lower limit of the operating frequency range and that has a smaller difference with the constant-voltage operating point obtained through calculation. The transmitter performs energy transmission between the transmitter and the receiver at this operating frequency. For example, the operating range of the transmitter is 110 kHz to 148.5 kHz, a value of the upper limit is 148.5 kHz, and a value of the lower limit is 110 kHz. Assuming that the value of the constant-voltage operating point obtained through calculation is 150 kHz, a difference between the value of the constant-voltage operating point obtained through calculation and the lower limit is greater than a difference between the value of the constant-voltage operating point obtained through calculation and the upper limit. Therefore, the processor of the transmitter controls the operating frequency of the transmitter to be the upper limit of the operating frequency range. This meets an operating frequency range limitation and can also ensure that the operating frequency of the transmitter is as close as possible to the constant-voltage operating point obtained through calculation.

If determining, in step 706, that the gain is 1, the processor of the transmitter controls an operating frequency of the transmitter to be the value of the constant-voltage operating point obtained through calculation, that is, controls a frequency of an alternating current that is output by the DC/AC circuit 213 to be still the value of the constant-voltage operating point determined in step 703.

If determining the modulated constant-voltage operating point in step 707, the processor of the transmitter controls a frequency of an alternating current that is output by the DC/AC circuit 213 to be a value of the modulated constant-voltage operating point.

In an energy transmission process, electric energy that is output by the transmitter is transmitted to the receiver through electromagnetic induction between the inductor L1 and the inductor L2. The receiver supplies electric energy to the load of the receiver after performing rectification by using the AC/DC circuit. In this case, an operating frequency of the transmitter is the constant-voltage operating frequency, the wireless electric energy transmission system presents a constant-voltage characteristic, and an output voltage of the receiver does not change due to a load change of the receiver.

Step 709: Detect an output voltage of the receiver.

In the energy transmission phase, the processor of the receiver persistently or periodically detects an output voltage of the AC/DC rectifier circuit of the receiver and sends a value of the detected output voltage to the transmitter.

Step 710: Determine whether a gain is 1.

The processor of the transmitter calculates a value of the gain based on a ratio of the output voltage of the receiver to the input voltage of the transmitter and determines whether the gain is 1.

If determining that the gain is not 1, the processor of the transmitter performs step 711. If determining that the gain is 1, the processor of the transmitter returns to step 709.

Step 711: Regulate an output voltage of the DC/DC circuit.

The processor of the transmitter regulates the output voltage of the DC/DC circuit 214, until the gain is 1.

Figure 11:
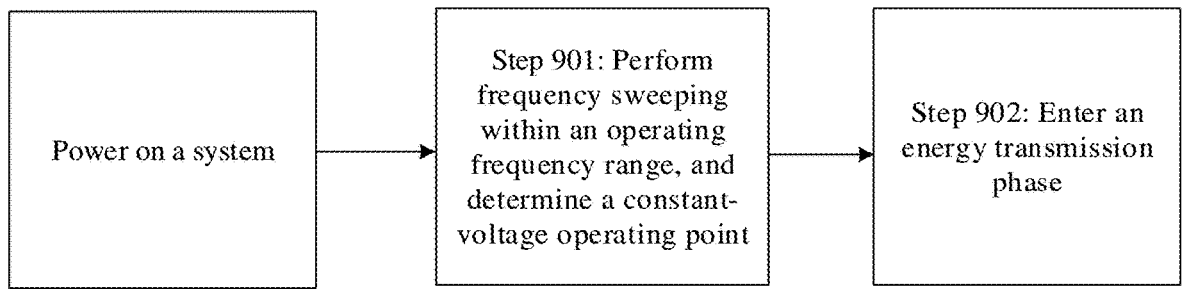
FIG. 11 is a schematic flowchart of a wireless electric energy transmission method according to an embodiment.

An embodiment further provides a wireless electric energy transmission method. The wireless electric energy transmission method may be applied to the wireless electric energy transmission system shown in FIG. 2A-1, FIG. 2B, or FIG. 12. A flowchart is shown in FIG. 11.

Step 901: Perform frequency sweeping within an operating frequency range of the DC/AC inverter circuit and determine a constant-voltage operating point of the transmitter by detecting an input voltage of the DC/AC inverter circuit and an output voltage of the AC/DC rectifier circuit.

When a ratio of the input voltage of the DC/AC inverter circuit to the output voltage of the AC/DC rectifier circuit reaches a preset threshold, an actual operating frequency of the DC/AC inverter circuit in this case is a constant-voltage output operating frequency, namely, the constant-voltage operating point, determined through frequency sweeping.

Optionally, after the constant-voltage operating point (constant-voltage operating frequency) is determined, if the determined constant-voltage operating frequency is an upper limit of the operating frequency range of the DC/AC circuit or exceeds the upper limit, in an implementation, the DC/AC circuit may be controlled to operate at the operating frequency upper limit, and a duty ratio may be adjusted, so that the system covers a larger distance range; or in another implementation, a previous-stage DC/DC circuit is added to the transmitter or a next-stage DC/DC circuit is added to the receiver, so that the system covers a larger distance range. The determined constant-voltage operating frequency may be a constant-voltage operating frequency obtained through calculation or may be an operating frequency obtained by modulating the constant-voltage operating frequency obtained through calculation, that is, a modulated constant-voltage operating frequency.

Optionally, considering impact of a load change of the receiver on a system gain, an actual operating frequency of the DC/AC inverter circuit is modulated within a range of the determined constant-voltage operating frequency, and a processor of the transmitter controls the DC/AC inverter circuit to modulate the actual operating frequency within a small range of the determined constant-voltage operating frequency. The frequency modulation range causes a gain range of the wireless electric energy transmission system to fall within a gain threshold range, for example, a range of 1 to 2 (which may include the two endpoint values: 1 and 2). A frequency range (fmin2, fmax2) of small-range frequency modulation is determined. The range of the small-range frequency modulation is a sub interval of an operating frequency range (fmin1, fmax1) of the DC/AC inverter circuit. There are two manners of determining the frequency range of the small-range frequency modulation: One manner is obtaining, based on the operating point determined in step 303, the frequency range of the small-range frequency modulation through calculation according to a preset algorithm; and the other manner is obtaining the frequency range of the small-range frequency modulation through small-range frequency sweeping in step 303.

Optionally, after the frequency range of the small-range frequency modulation is determined, if fmax2 of the determined frequency range of the small-range frequency modulation is the upper limit of the operating frequency range of the DC/AC circuit or exceeds the upper limit, in an implementation, a duty ratio may be controlled to be adjusted when the DC/AC circuit operates at the operating frequency upper limit, so that the system covers a larger distance range.

Step 902: Enter an energy transmission phase.

For descriptions of this step, refer to those of the foregoing step 304.

After entering the energy transmission phase, a processor of the receiver persistently or periodically detects an output voltage of the AC/DC circuit of the receiver and sends a value of the detected output voltage to the transmitter. The processor of the transmitter calculates a value of a gain based on an input voltage of the transmitter and determines whether the gain is a preset threshold. If the gain is the preset threshold, the transmitter performs no operation, and returns to output voltage detection. If the gain is not the preset threshold, the transmitter controls an operating frequency of the DC/AC circuit to be modulated within a small range of the operating point, so that the voltage gain reaches the preset threshold. For a schematic flowchart, see the following FIG. 3C.

In an embodiment, in addition to a resonant frequency f0 and a coupling coefficient k, a relative position between a transmitter and a receiver may be obtained by using parameters such as system efficiency, a transmit coil current, and a voltage of the receiver, to calculate a constant-voltage operating frequency based on a correspondence between the relative position and the constant-voltage operating frequency. A parameter that can be used to calculate the relative position between the transmitter and the receiver may be at least one of the following:

system efficiency of a wireless electric energy transmission system, an output voltage of an AC/DC rectifier circuit of the receiver, a current of an inductor L1 of the transmitter, a self-inductance amount of the inductor L1 of the transmitter, a self-inductance amount of an inductor L2 of the receiver, a mutual inductance amount between the inductor L1 and the inductor L2, or a coupling coefficient between the inductor L1 and the inductor L2.

This embodiment provides a wireless electric energy transmission system. The system includes a transmitter and a receiver. The transmitter includes at least a DC/AC inverter circuit, a first inductor L1, and a first capacitor C1. The receiver includes at least an AC/DC rectifier circuit, a second inductor L2, and a second capacitor C2. Electric energy of the transmitter is transmitted to the receiver through electromagnetic induction between the first inductor and the second inductor. The AC/DC rectifier circuit is configured to provide rectified electric energy to a load of the receiver. The inductor L1 and the capacitor C1 may be connected in series or may be connected in parallel. The inductor L2 and the second capacitor C2 may be connected in series or may be connected in parallel. For a diagram of a structure of the wireless electric energy transmission system, refer to FIG. 2A-1, FIG. 2B, or FIG. 12.

One or more of the foregoing parameters that can be used to calculate a relative position between the transmitter and the receiver are detected, and the relative position between the receiver and the transmitter is determined based on a stored correspondence between a combination of the one or more parameters and the relative position; and a value of a constant-voltage operating point is determined based on a stored correspondence between the relative position and the constant-voltage operating point. The correspondence between the combination of the one or more parameters and the relative position and the correspondence between the relative position and the constant-voltage operating point are both obtained in advance through measurement and stored in the system.

Optionally, as shown in FIG. 2A-2, a function relationship exists between a coil inductance and the relative position. The coil inductance (a self-inductance amount of the inductor L1 of the transmitter, a self-inductance amount of the inductor L2 of the receiver, or a mutual inductance amount between the inductor L1 and the inductor L2) is detected, and the relative position between the receiver and the transmitter is determined based on a stored correspondence between the coil inductance and the relative position; and the value of the constant-voltage operating point is determined based on the stored correspondence between the relative position and the constant-voltage operating point. The correspondence between the coil inductance and the relative position and the correspondence between the relative position and the constant-voltage operating point are both obtained in advance through measurement.

Optionally, as shown in FIG. 2A-3, a function relationship exists between a coupling coefficient and the relative position. The coupling coefficient between the transmitter and the receiver is detected, and the relative position between the receiver and the transmitter is determined based on a stored correspondence between the coupling coefficient and the relative position; and the value of the constant-voltage operating point is determined based on the stored correspondence between the relative position and the constant-voltage operating point. The correspondence between the coupling coefficient and the relative position and the correspondence between the relative position and the constant-voltage operating point are both obtained in advance through measurement. For a method for calculating the coupling coefficient, refer to steps 501 to 505 shown in FIG. 7.

Optionally, as shown in FIG. 2A-4, a function relationship exists between a transmit coil current and the relative position. The transmit coil current is detected, and the relative position between the receiver and the transmitter is determined based on a stored correspondence between the transmit coil current and the relative position; and the value of the constant-voltage operating point is determined based on the stored correspondence between the relative position and the constant-voltage operating point. The correspondence between the transmit coil current and the relative position and the correspondence between the relative position and the constant-voltage operating point are both obtained in advance through measurement.

Optionally, as shown in FIG. 2A-5, a function relationship exists between efficiency of the wireless electric energy transmission system and the relative position. The efficiency of the wireless electric energy transmission system is detected, and the relative position between the receiver and the transmitter is determined based on a stored correspondence between the efficiency of the wireless electric energy transmission system and the relative position; and the value of the constant-voltage operating point is determined based on the stored correspondence between the relative position and the constant-voltage operating point. The correspondence between the efficiency of the wireless electric energy transmission system and the relative position and the correspondence between the relative position and the constant-voltage operating point are both obtained in advance through measurement.

Optionally, a function relationship exists between a rectified output voltage of the receiver and the relative position. The rectified output voltage of the receiver is detected, and the relative position between the receiver and the transmitter is determined based on a stored correspondence between the rectified output voltage of the receiver and the relative position; and the value of the constant-voltage operating point is determined based on the stored correspondence between the relative position and the constant-voltage operating point. The correspondence between the rectified output voltage of the receiver and the relative position and the correspondence between the relative position and the constant-voltage operating point are both obtained in advance through measurement.

A constant-voltage operating frequency depends on an inductance $L_1$, a resonant capacitance $C_1$, and a coupling coefficient k. The inductance $L_1$ and the coupling coefficient k are affected by an installation distance between a transmitter and a receiver.

Therefore, when the relative installation distance between the transmitter and the receiver changes within a range, a constant-voltage operating frequency of a wireless power supply system also accordingly changes. Considering coil transmission efficiency and the electromagnetic compatibility (EMC) standard, operating within a frequency range is usually recommended. According to a limitation of the harmonized European standard of the European Telecommunications Standards Institute (ETSI) for magnetic field strength H, an upper limit of magnetic field strength H detected at 10 m for a circuit whose operating frequency range is 140 kHz to 148.5 kHz is 37.7 dBuA/m, and an upper limit of magnetic field strength H detected at 10 m for a circuit whose operating frequency range is 148.5 kHz to 300 kHz is −5 dBuA/m. Therefore, usually, an operating frequency upper limit of a kilohertz wireless power supply system is at most 148.5 kHz, and an operating frequency range in an existing solution is usually 110 kHz to 148.5 kHz. When the wireless power supply system provided in this embodiment operates at a constant-voltage operating frequency, considering an operating frequency range limitation, one stage of DC/DC circuit is added, to accommodate to a constant-voltage operating frequency change caused by a change of the relative distance between the transmitter and the receiver.

Figure 12:
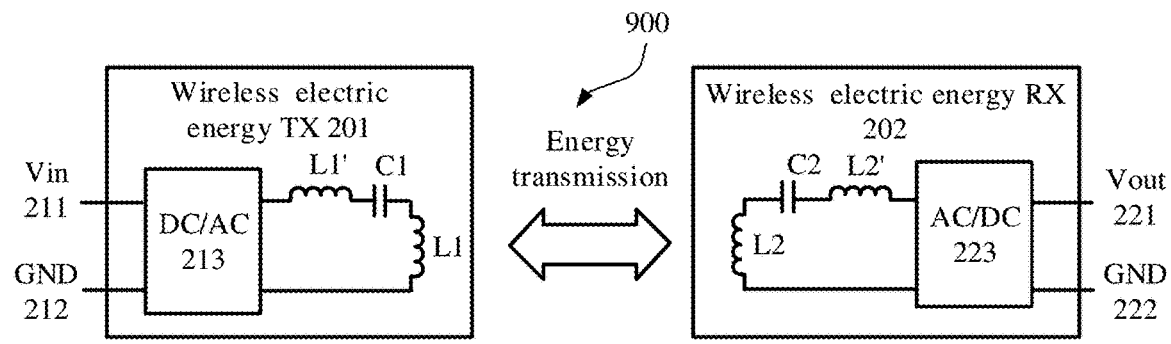
FIG. 12 is a schematic diagram of a structure of a wireless electric energy transmission system according to an embodiment.

In another embodiment, a wireless power supply system 900 shown in FIG. 12 is obtained by respectively adding compensating inductors to the receiver and the transmitter based on the wireless power supply system 200 in FIG. 2A-1.

A wireless electric energy transmitter TX 201 in the wireless power supply system 900 is a wireless power supply unit 101 of an indoor unit, and a wireless electric energy receiver RX 202 in the wireless power supply system 900 is a wireless power receiving unit 103 of an outdoor unit. Energy transmission between the transmitter TX 201 and the receiver RX 202 is implemented through electromagnetic induction between an inductor L1 and an inductor L2.

The wireless electric energy transmitter TX 201 includes a resonant circuit formed by connecting a direct current/alternating current (DC/AC) inverter circuit 213, a capacitor C1, the inductor L1, and a compensating inductor L1 in series. The DC/AC inverter circuit 213 may use a half-bridge or full-bridge topology. An end 211 of the wireless electric energy TX 201 may be connected to a load (for example, the load 102 in FIG. 1), and then connected to a power supply; or an end 211 of the wireless electric energy TX 201 may be directly connected to a power supply. Vin indicates an input voltage of the wireless electric energy TX, and GND 212 indicates a wire ground terminal.

The wireless electric energy receiver RX 202 includes a resonant circuit formed by connecting an alternating current/direct current (AC/DC) rectifier circuit 223, a capacitor C2, the inductor L2, and a compensating inductor L2' in series. The AC/DC rectifier circuit may use a synchronous or diode rectification manner of a half-bridge or full-bridge topology. An end 221 of the wireless electric energy RX 202 may be connected to a load (for example, the load 104 in FIG. 1). Vout indicates an output voltage of the wireless electric energy RX, and GND indicates a wire ground terminal.

The wireless electric energy TX 201 includes the DC/AC circuit 213, the capacitor C1, the inductor L1, and the compensating inductor L1. The DC/AC circuit 213 is connected to the capacitor C1 and the inductor L1 in series. To distinguish between the inductor L1 and the compensating inductor L1, the inductor L1 may be referred to as a first resonant inductor.

The wireless electric energy RX 202 includes the AC/DC circuit 223, the capacitor C2, the inductor L2, and the compensating inductor L2'. The AC/DC circuit 223 is connected to the capacitor C2 and the inductor L2 in series. To distinguish between the inductor L2 and the compensating inductor L2', the inductor L2 may be referred to as a second resonant inductor.

Considering an operating frequency range limitation of the DC/AC circuit, during circuit designing, values of resonant capacitances $C_1$ and $C_2$ and compensating inductances $L_1'$ and $L_2'$ may be designed based on an expected operating frequency range ($f_{min}$, $f_{max}$), a change range ($L_{min}$, $L_{max}$) of an inductance $L_1$ due to a change of a relative installation distance between the transmitter and the receiver, and a coupling coefficient range ($k_{min}$, $k_{max}$). Therefore, when the relative installation distance between the transmitter and the receiver changes, a constant-voltage operating frequency can fall within the specified operating frequency range. In this embodiment, compensating inductors, namely, L1' and L2', are respectively added to a primary side and a secondary side, so that an added stage of DC/DC circuit is omitted.

Values of the added inductance $L_1'$ and the resonant capacitance $C_1$ may be obtained based on the operating frequency range ($f_{min}$, $f_{max}$) and the coupling coefficient range ($k_{min}$, $k_{max}$):

$$L_1' = \frac{f_{min}^2}{f_{max}^2 - f_{min}^2}\left[\frac{f_{max}^2}{f_{min}^2}(k_{max}L_{max} - L_{max}) + L_{min} - k_{min}L_{min}\right]$$

$$C_1 = \frac{1}{\omega_{min}^2(L_1' + L_{min} - k_{min}L_{min})}$$

$\omega_{min}$ is an angular velocity corresponding to a minimum operating frequency of the transmitter.

$f_{min}$ is an operating frequency lower limit value of the DC/AC circuit, and $f_{max}$ is an operating frequency upper limit value of the DC/AC circuit.

$k_{min}$ is a coupling coefficient lower limit value, $k_{max}$ is a coupling coefficient upper limit value, and the two coupling coefficient limit values are obtained in advance through testing. For example, a change range of the distance between the wireless electric energy TX and the wireless electric energy RX or a change range of a distance between the inductor L1 and the inductor L2 in an actual scenario is tested, and a coupling coefficient change range corresponding to the distance change range is between a coupling coefficient upper limit and lower limit.

$L_{min}$ and $L_{max}$ are a preset lower limit value and upper limit value. As shown in FIG. 12, if the distance between the inductor L1 and the inductor $L_2$ changes, because mutual inductance occurs between the inductor L1 and the inductor $L_2$, an actual value of the inductor L1 changes due to the distance change. Therefore, an upper limit and a lower limit of actual inductance values of the inductor L1 at different distances can be obtained through measurement, that is, $L_{min}$ and $L_{max}$ can be obtained.

Figure 13:
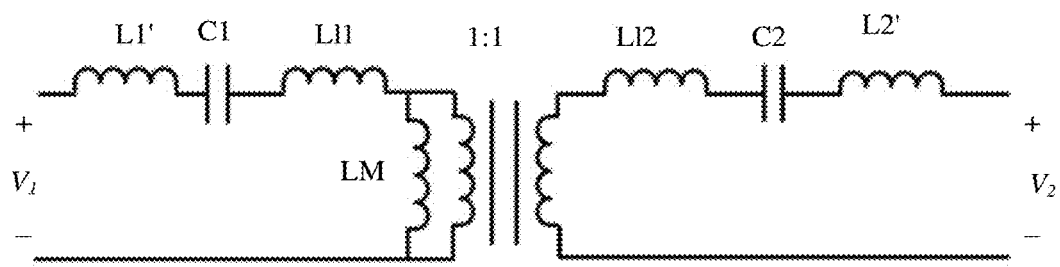
FIG. 13 shows an equivalent circuit model of a wireless electric energy transmission system according to an embodiment.

FIG. 13 is an equivalent circuit model of FIG. 12, and the DC/AC circuit 213 and the AC/DC circuit 223 in FIG. 12 are omitted in FIG. 13. Ll1 and Ll2 are respectively leakage inductors of the transmitter and the receiver, LM is a mutual inductance coil refracted on the primary side, and 1:1 indicates an ideal transformer.

When a reactance sum of a leakage inductance $L_{l1}$, the resonant capacitance $C_1$, and the compensating inductance $L_1'$ of the transmitter and a reactance sum of a leakage inductance $L_{l2}$, the resonant capacitance $C_2$, and the compensating inductance $L_2'$ of the receiver are both zero, that is:

$$j\omega L_1' + j\omega L_{l1} += \frac{1}{j\omega C_1} = 0$$

$$j\omega L_2' + j\omega L_{l2} + \frac{1}{j\omega C_2} = 0,$$

where j indicates an imaginary number, and ω indicates an angular velocity corresponding to an operating frequency of the transmitter, a relationship between an input voltage $V_1$ of the transmitter and an output voltage $V_2$ of the receiver is as follows:

$$V_2 = V_1$$

The output voltage $V_2$ is correlated with only the input voltage $V_1$, and is uncorrelated with load of the receiver. Therefore, an operating frequency ω obtained when the reactance sum of the leakage inductance $L_{l1}$, the resonant capacitance $C_1$, and the compensating inductance $L_1$ of the transmitter and the reactance sum of the leakage inductance $L_{l2}$, the resonant capacitance $C_2$, and the compensating inductance $L_2'$ of the receiver are both zero is a constant-voltage operating frequency f. When the wireless power supply system operates at the constant-voltage operating frequency, an output voltage of the receiver does not change with a load change of the receiver and has a steady output characteristic. In an actual system, considering a resistance and capacitance tolerance and a coil resistance, an actual constant-voltage operating frequency may need to be modulated within a small range near the constant-voltage operating frequency obtained through calculation.

Figure 14:
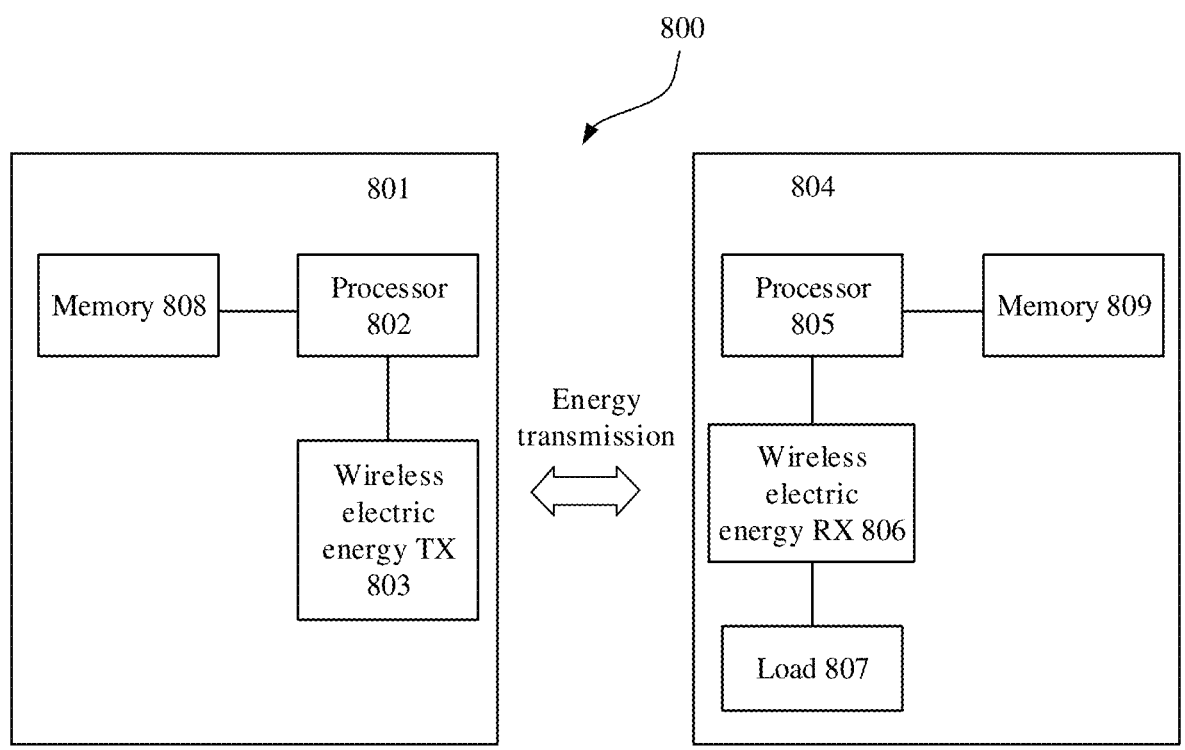
FIG. 14 is a schematic diagram of a structure of a wireless electric energy transmission system according to an embodiment.

As shown in FIG. 14, an embodiment provides a schematic diagram of a structure of a wireless electric energy transmission system 800. CPE includes the wireless electric energy transmission system 800.

In an implementation, a unit 801 in the wireless electric energy transmission system 800 may be an indoor unit in the CPE, and a unit 804 may be an outdoor unit in the CPE. In another implementation, the unit 801 in the wireless electric energy transmission system 800 may be an outdoor unit in the CPE, and the unit 804 may be an indoor unit in the CPE.

For example, the unit 801 in the wireless electric energy transmission system 800 is an indoor unit in the CPE, and the unit 804 is an outdoor unit in the CPE. The indoor unit 801 may include a wireless electric energy transmitter TX 803 and a processor 802 and may further include a memory 808. The processor 802 is connected to the wireless electric energy transmitter 803. The outdoor unit 804 may include a wireless electric energy receiver RX 806 and a processor 805. The processor 805 is connected to the wireless electric energy receiver 806. The outdoor unit 804 may further include a load 807 and may further include a memory 809. Energy transmission between the indoor unit 801 and the outdoor unit 804 is implemented through electromagnetic induction between the wireless electric energy TX 803 and the wireless electric energy RX 806. A structure of each of the wireless electric energy TX 803 and the wireless electric energy RX 806 may be any one of the structures provided in the embodiments.

The processor 802 is the processor of the transmitter in the foregoing embodiments, and may be configured to: calculate a constant-voltage operating frequency of the wireless electric energy TX 803, and control the wireless electric energy TX 803 to operate at the constant-voltage operating frequency, so that the wireless electric energy TX 803 and the wireless electric energy RX 806 present a constant-voltage output characteristic, and a voltage that is output by the wireless electric energy RX 806 is not affected by the load 807.

The processor 805 is the processor of the receiver in the foregoing embodiments and may be configured to: detect an output voltage of the wireless electric energy RX 806 and a gain, and feedback the output voltage and the gain to the wireless electric energy transmitter TX 803, to calculate the constant-voltage operating frequency.

Optionally, the processor 802 may be a partial component in the wireless electric energy transmitter 803 or may be a component independent of the wireless electric energy transmitter 803.

Optionally, the processor 805 may be a partial component in the wireless electric energy receiver 806 or may be a component independent of the wireless electric energy receiver 806.

Optionally, the processor 802 and the processor 805 may be located in another processing device independent of the unit 801 and the unit 804. That is, the system 800 may further include the processing device.

The processor 802 or 805 may be a central processing unit (CPU). Alternatively, the processor may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like.

The memory 808 stores a computer program. The processor 802 may be configured to execute the computer program in the corresponding memory 808, to implement the steps performed by the transmitter in the foregoing embodiments. The memory 808 is a nonvolatile storage medium, and usually includes an internal storage and an external storage. The internal storage includes but is not limited to a random access memory (RAM), a read-only memory (ROM), a cache, or the like. The external storage includes but is not limited to a flash memory, a hard disk, an optical disc, a universal serial bus (USB) disk, or the like. The computer program is usually stored in the external storage. Before executing the computer program, the processor loads the program from the external storage to the internal storage. The memory 808 may be independent and connected to the processor 802 by using a bus; or the memory 808 may be integrated into a chip subsystem with the processor 802.

The memory 809 is similar to the memory 808. The processor 805 may be configured to execute a computer program in the corresponding memory 809, to implement the steps performed by the receiver in the foregoing embodiments. The memory 809 may be independent and connected to the processor 805 by using a bus; or the memory 809 may be integrated into a chip subsystem with the processor 805.

It should be noted that module or unit division in the foregoing embodiments is only shown as an example, and functions of the described modules are merely described as an example. The embodiments are not limited thereto. A person of ordinary skill in the art may combine functions of two or more of the modules or divide functions of one module to obtain more finer-grained modules and other variant manners as required.

Mutual reference may be made to the same or similar parts of the embodiments described above. "Plurality of" means two or more or "at least two" unless otherwise specified. "A/B" includes three cases: "A", "B", and "A and B".

The apparatus embodiments described above are merely examples. The modules described as separate parts may or may not be physically separate, and parts displayed as modules may or may not be physical modules, that is, may be located in one position, or may be distributed on a plurality of network modules. Some or all of the modules may be selected based on actual requirement to achieve the objectives of the solutions of the embodiments. In addition, in the accompanying drawings of the apparatus embodiments, connection relationships between modules indicate that the modules have communications connections with each other and may be implemented as one or more communications buses or signal cables. A person of ordinary skill in the art may understand and implement the embodiments without creative efforts.

The foregoing descriptions are merely some implementations, but the scope of the embodiments are not limited thereto.

What is claimed is:

1. A wireless electric energy transmission system comprising:
   a transmitter comprising:
      a DC/AC inverter circuit,
      a first inductor, and
      a first capacitor that are connected in series; and
   a receiver, comprising:
      an AC/DC rectifier circuit,
      a second inductor, and
      a second capacitor that are connected in series, wherein electric energy of the transmitter is transmitted to the receiver through electromagnetic induction between the first inductor and the second inductor, and the AC/DC rectifier circuit is configured to rectify the electric energy transmitted by the transmitter to the receiver; and the transmitter is configured to:
   detect a value of a resonant frequency of the transmitter;
   detect a value of a coupling coefficient between the transmitter and the receiver;
   obtain a value of a constant-voltage operating frequency of the transmitter through calculation based on the resonant frequency and the coupling coefficient; and
   control an operating frequency of the DC/AC inverter circuit based on the constant-voltage operating frequency obtained through calculation;
   wherein the transmitter is configured to control the operating frequency of the DC/AC inverter circuit by supplying an input voltage at a first value of the operating frequency that is configured to be rectified to a constant voltage, subsequently adjusting the first value of the operating frequency to a second value of the operating frequency that is configured to be rectified to the constant voltage, and subsequently supplying the input voltage at the second value of the operating frequency.

2. The wireless electric energy transmission system according to claim 1, wherein the receiver is configured to:
   detect a value of an output voltage of the AC/DC rectifier circuit; and the transmitter is configured to:
   calculate a value of a first inductance based on the resonant frequency and a first capacitance;
   detect a value of a first current of the transmitter that passes through the first inductor at a first operating frequency; and
   obtain the value of the coupling coefficient through calculation based on values of the output voltage of the AC/DC rectifier circuit, the first inductance, the first current, and the first operating frequency.

3. The wireless electric energy transmission system according to claim 2, wherein the transmitter is further configured to:
obtain the value of the coupling coefficient through calculation based on values of the output voltage of the AC/DC rectifier circuit, the first inductance, the first current, the first operating frequency, and a calibration coefficient.

4. The wireless electric energy transmission system according to claim 1, wherein the transmitter is configured to:
obtain the resonant frequency of the transmitter through calculation based on an oscillation period of a voltage between the first capacitor and the first inductor.

5. The wireless electric energy transmission system according to claim 1, wherein the receiver is configured to detect an output voltage of the receiver; and the transmitter is configured to:
determine that a value of a gain is not equal to a first threshold, wherein the gain is a ratio of the output voltage of the receiver to the input voltage of the transmitter;
modulate, within a preset range, the constant-voltage operating frequency obtained through calculation, until the value of the gain is equal to the first threshold; and
control the operating frequency of the DC/AC inverter circuit to be a modulated constant-voltage operating frequency.

6. The wireless electric energy transmission system according to claim 1, wherein the transmitter is configured to
control the operating frequency of the DC/AC inverter circuit to be the constant-voltage operating frequency obtained through calculation.

7. The wireless electric energy transmission system according to claim 1, wherein the receiver is configured to detect an output voltage of the receiver; and the transmitter is configured to:
determine that a value of a gain is not equal to a first threshold, wherein the gain is a ratio of the output voltage of the receiver to anthe input voltage of the transmitter;
perform frequency sweeping within a preset range based on the constant-voltage operating frequency obtained through calculation, until the value of the gain is equal to the first threshold; and
control the operating frequency of the DC/AC inverter circuit to be a modulated constant-voltage operating frequency, wherein the modulated constant-voltage operating frequency is a constant-voltage operating frequency obtained when the value of the gain is equal to the first threshold.

8. The wireless electric energy transmission system according to claim 1, wherein the transmitter further comprises
a DC/DC circuit, and the DC/DC circuit is connected to the DC/AC inverter circuit in series;
the receiver is configured to
detect an output voltage of the receiver; and the transmitter is configured to:
determine that the constant-voltage operating frequency obtained through calculation does not fall within an operating frequency range of the DC/AC inverter circuit;
control the operating frequency of the DC/AC inverter circuit to be a limit value of the operating frequency range, wherein the limit value is a limit that is in an upper limit and a lower limit of the operating frequency range and that has a smaller difference with the constant-voltage operating frequency obtained through calculation; and
regulate an output voltage of the DC/DC circuit until a value of a gain is equal to a first threshold, wherein the gain is a ratio of the output voltage of the receiver to anthe input voltage of the transmitter.

9. The wireless electric energy transmission system according to claim 1, wherein the receiver is configured to detect an output voltage of the receiver; and the transmitter is configured to:
determine that the constant-voltage operating frequency obtained through calculation does not fall within an operating frequency range of the DC/AC inverter circuit;
control the operating frequency of the DC/AC inverter circuit to be a limit value of the operating frequency range, wherein the limit value is a limit that is in an upper limit and a lower limit of the operating frequency range and that has a smaller difference with the constant-voltage operating frequency obtained through calculation; and
adjust a duty ratio of the DC/AC inverter circuit until a value of a gain is equal to a first threshold, wherein the gain is a ratio of the output voltage of the receiver to the input voltage of the transmitter.

10. A wireless electric energy transmission control method applied to a transmitter comprising a DC/AC inverter circuit, a first inductor, and a first capacitor, wherein electric energy of the transmitter is transmitted to a receiver through electromagnetic induction between the first inductor and a second inductor of the receiver, and the method comprises:
detecting, by the transmitter, a value of a resonant frequency of the transmitter;
detecting, by the transmitter, a value of a coupling coefficient between the transmitter and the receiver;
obtaining, by the transmitter, a value of a constant-voltage operating frequency of the transmitter through calculation based on the resonant frequency and the coupling coefficient; and
controlling, by the transmitter, an operating frequency of the DC/AC inverter circuit based on the constant-voltage operating frequency obtained through calculation;
wherein controlling the operating frequency of the DC/AC inverter circuit comprises supplying an input voltage at a first value of the operating frequency that is configured to be rectified to a constant voltage, subsequently adjusting the first value of the operating frequency to a second value of the operating frequency that is configured to be rectified to the constant voltage, and subsequently supplying the input voltage at the second value of the operating frequency.

11. The wireless electric energy transmission control method according to claim 10, wherein detecting the value of the coupling coefficient between the transmitter and the receiver further comprises:
calculating, by the transmitter, a value of a first inductance based on the resonant frequency and a first capacitance;
detecting, by the transmitter, a value of a first current of the transmitter that passes through the first inductor at a first operating frequency; and obtaining, by the transmitter, the value of the coupling coefficient through calculation based on values of an output voltage of an AC/DC rectifier circuit, the first inductance, the first current, and the first operating frequency.

12. The wireless electric energy transmission control method according to claim 11, wherein obtaining, by the transmitter, the value of the coupling coefficient through calculation further comprises:
obtaining the value of the coupling coefficient through calculation based on values of the output voltage of the AC/DC rectifier circuit, the first inductance, the first current, the first operating frequency, and a calibration coefficient.

13. The wireless electric energy transmission control method according to claim 10, wherein detecting, by the transmitter, the value of the resonant frequency of the transmitter further comprises:
obtaining, by the transmitter, the resonant frequency of the transmitter through calculation based on an oscillation period of a voltage between the first capacitor and the first inductor.

14. The wireless electric energy transmission control method according to claim 10, further comprising:
determining, by the transmitter, that a value of a gain is not equal to a first threshold, wherein the gain is a ratio of an output voltage of the receiver to anthe input voltage of the transmitter; and
modulating, by the transmitter within a preset range, the constant-voltage operating frequency obtained through calculation, until the value of the gain is equal to the first threshold; and
controlling, by the transmitter, the operating frequency of the DC/AC inverter circuit based on the constant-voltage operating frequency obtained through calculation further comprises:
controlling the operating frequency of the DC/AC inverter circuit to be a modulated constant-voltage operating frequency.

15. The wireless electric energy transmission control method according to claim 10, wherein controlling, by the transmitter, the operating frequency of the DC/AC inverter circuit based on the constant-voltage operating frequency obtained through calculation further comprises:
controlling the operating frequency of the DC/AC inverter circuit to be the constant-voltage operating frequency obtained through calculation.

16. The wireless electric energy transmission control method according to claim 10, further comprising:
determining, by the transmitter, that a value of a gain is not equal to a first threshold, wherein the gain is a ratio of an output voltage of the receiver to the input voltage of the transmitter;
performing, by the transmitter, frequency sweeping within a preset range based on the constant-voltage operating frequency obtained through calculation, until the value of the gain is equal to the first threshold; and
controlling, by the transmitter, the operating frequency of the DC/AC inverter circuit based on the constant-voltage operating frequency obtained through calculation further comprises:
controlling the operating frequency of the DC/AC inverter circuit to be a modulated constant-voltage operating frequency, wherein the modulated constant-voltage operating frequency is a constant-voltage operating frequency obtained when the value of the gain is equal to the first threshold.

17. The wireless electric energy transmission control method according to claim 10, wherein the transmitter further comprises a DC/DC circuit, the DC/DC circuit is connected to the DC/AC inverter circuit in series, and the method further comprises:
determining, by the transmitter, that the constant-voltage operating frequency does not fall within an operating frequency range of the DC/AC inverter circuit;
controlling, by the transmitter, the operating frequency of the DC/AC inverter circuit to be a limit value of the operating frequency range, wherein the limit value is a limit that is in an upper limit and a lower limit of the operating frequency range and that has a smaller difference with the constant-voltage operating frequency obtained through calculation; and
regulating, by the transmitter, an output voltage of the DC/DC circuit until a value of a gain is equal to a first threshold, wherein the gain is a ratio of an output voltage of the receiver to anthe input voltage of the transmitter.

18. The wireless electric energy transmission control method according to claim 10, further comprising:
determining, by the transmitter, that the constant-voltage operating frequency obtained through calculation does not fall within an operating frequency range of the DC/AC inverter circuit;
controlling, by the transmitter, the operating frequency of the DC/AC inverter circuit to be a limit value of the operating frequency range, wherein the limit value is a limit that is in an upper limit and a lower limit of the operating frequency range and that has a smaller difference with the constant-voltage operating frequency obtained through calculation; and
adjusting, by the transmitter, a duty ratio of the DC/AC inverter circuit until a value of a gain is equal to a first threshold, wherein the gain is a ratio of an output voltage of the receiver to anthe input voltage of the transmitter.

19. A wireless electric energy transmission control wireless electric energy transmission control method, wherein the method is applied to a receiver, the receiver comprises an AC/DC rectifier circuit, a second inductor, and a second capacitor, electric energy of a transmitter is transmitted to the receiver through electromagnetic induction between a first inductor of the transmitter and the second inductor, the AC/DC rectifier circuit is configured to rectify the electric energy transmitted by the transmitter to the receiver, and the method comprises:
receiving, by the receiver, an input voltage provided at a first frequency by the transmitter to the receiver, and rectifying the input voltage provided at the first frequency into a constant voltage;
following variation of the output voltage of the AC/DC rectifier circuit from the constant voltage, detecting, by the receiver, a value of the output voltage of the AC/DC rectifier circuit;
sending, by the receiver, the value of the output voltage to the transmitter; and
receiving, by the receiver, the input voltage provided at a second frequency by the transmitter to the receiver, and rectifying the input voltage provided at the second frequency into the constant voltage.

* * * * *